United States Patent
Zhou et al.

(10) Patent No.: US 11,909,481 B2
(45) Date of Patent: Feb. 20, 2024

(54) DEFAULT CHANNEL STATE INFORMATION (CSI)-REFERENCE SIGNAL (RS) BEAM

(71) Applicant: QUALCOMM Incorporated, San Diego, CA (US)

(72) Inventors: Yan Zhou, San Diego, CA (US); Mostafa Khoshnevisan, San Diego, CA (US); Tao Luo, San Diego, CA (US); Xiaoxia Zhang, San Diego, CA (US); Wooseok Nam, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/173,984

(22) Filed: Feb. 11, 2021

(65) Prior Publication Data

US 2021/0320699 A1 Oct. 14, 2021

Related U.S. Application Data

(60) Provisional application No. 63/008,585, filed on Apr. 10, 2020, provisional application No. 63/007,903, filed on Apr. 9, 2020.

(51) Int. Cl.
*H04L 5/00* (2006.01)
*H04B 7/06* (2006.01)
(Continued)

(52) U.S. Cl.
CPC .......... *H04B 7/0626* (2013.01); *H04B 7/088* (2013.01); *H04L 5/0048* (2013.01); *H04W 72/23* (2023.01)

(58) Field of Classification Search
CPC ..... H04B 7/0695; H04B 7/088; H04B 7/0626
See application file for complete search history.

(56) References Cited

U.S. PATENT DOCUMENTS

| | | | |
|---|---|---|---|
| 2014/0003240 A1* | 1/2014 | Chen | H04L 5/0055 370/235 |
| 2019/0239245 A1* | 8/2019 | Davydov | H04L 5/0048 |

(Continued)

FOREIGN PATENT DOCUMENTS

| | | |
|---|---|---|
| CN | 106793125 A | 5/2017 |
| CN | 109802787 A | 5/2019 |

(Continued)

OTHER PUBLICATIONS

International Search Report and Written Opinion—PCT/US2021/017860—ISA/EPO—dated Jun. 1, 2021.
(Continued)

*Primary Examiner* — Romani Ohri
(74) *Attorney, Agent, or Firm* — Patterson & Sheridan LLP

(57) ABSTRACT

Certain aspects of the subject matter described in this disclosure can be implemented in a method for wireless communication by a user equipment (UE). The method generally includes determining whether a plurality of beam configurations configured for processing one or more downlink (DL) signals are different than a first beam configuration for processing at least one CSI-RS, the one or more DL signals to be received in the same symbol as the at least one CSI-RS; selecting a second beam configuration for processing the at least one CSI-RS based on the determination; receiving the at least one CSI-RS; and processing the at least one CSI-RS based on the selected second beam configuration.

20 Claims, 18 Drawing Sheets

(51) Int. Cl.
*H04B 7/08* (2006.01)
*H04W 72/23* (2023.01)

(56) References Cited

U.S. PATENT DOCUMENTS

| | | | |
|---|---|---|---|
| 2020/0100154 A1* | 3/2020 | Cirik | H04W 36/0072 |
| 2021/0167911 A1* | 6/2021 | Xiao | H04W 72/23 |
| 2021/0329517 A1* | 10/2021 | Noh | H04B 7/0639 |
| 2022/0201697 A1* | 6/2022 | Yamamoto | H04W 72/23 |

FOREIGN PATENT DOCUMENTS

| | | |
|---|---|---|
| CN | 110391882 A | 10/2019 |
| EP | 3713140 A1 | 9/2020 |
| TW | 201937873 A | 9/2019 |
| WO | 2018217063 A1 | 11/2018 |
| WO | 2019095893 A1 | 5/2019 |

OTHER PUBLICATIONS

Qualcomm Incorporated: "Beam Management for NR", 3GPP Draft, 3GPP TSG-RAN WG1 Meeting 93, R1-1807341 Beam Management For NR, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051442533, pp. 1-11.

Qualcomm Incorporated: "Beam Management for NR", 3GPP TSG-RAN WG1 Meeting #94, 3GPP Draft, R1-1809711 Beam Management For NR, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 17, 2018 (Aug. 17, 2018), 16 Pages, XP051517061.

* cited by examiner

DEFAULT CHANNEL STATE INFORMATION (CSI)-REFERENCE SIGNAL (RS) BEAM

CROSS-REFERENCE TO RELATED APPLICATION

This application claims benefit of and priority to U.S. Provisional Application No. 63/007,903, filed Apr. 9, 2020, entitled "DEFAULT CHANNEL STATE INFORMATION (CSI)-REFERENCE SIGNAL (RS) BEAM", and U.S. Provisional Application No. 63/008,585, filed Apr. 10, 2020, entitled "ENHANCED DEFAULT APERIODIC (AP) CHANNEL STATE INFORMATION REFERENCE SIGNAL (CSI-RS) BEAM RULES FOR MULTI-DOWNLINK CONTROL INFORMATION (DCI)-BASED MULTIPLE TRANSMISSION AND RECEPTION POINT (mTRP)", which are hereby assigned to the assignee hereof and hereby expressly incorporated by reference herein in their entireties as if fully set forth below and for all applicable purposes.

INTRODUCTION

Aspects of the present disclosure relate to wireless communications, and more particularly, to techniques for selection of a beam configuration.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved channel state information (CSI) reporting.

Certain aspects of the subject matter described in this disclosure can be implemented in a method for wireless communication by a user-equipment (UE). The method generally includes: determining whether a plurality of beam configurations configured for processing one or more downlink (DL) signals are different than a first beam configuration for processing at least one CSI-RS, the one or more DL signals to be received in the same symbol as the at least one CSI-RS; selecting a second beam configuration for processing the at least one CSI-RS based on the determination; receiving the at least one CSI-RS; and processing the at least one CSI-RS based on the selected second beam configuration.

Certain aspects of the subject matter described in this disclosure can be implemented in a method for wireless communication by a UE. The method generally includes: receiving an indication of a plurality of beam configurations; determining whether the plurality of beam configurations are different than a first beam configuration for processing at least one CSI-RS; selecting a second beam configuration for processing the at least one CSI-RS based on the determination; receiving the at least one CSI-RS; and processing the at least one CSI-RS based on the selected second beam configuration.

Certain aspects of the subject matter described in this disclosure can be implemented in a method for wireless communication. The method generally includes: determining whether a plurality of beam configurations configured for transmission of one or more downlink (DL) signals are different than a first beam configuration for transmission of at least one CSI-RS, the one or more DL signals to be transmitted in the same symbol as the at least one CSI-RS; selecting a second beam configuration for transmission of the at least one CSI-RS based on the determination; and transmitting, to a UE, the at least one CSI-RS based on the selected second beam configuration.

Certain aspects of the subject matter described in this disclosure can be implemented in a method for wireless communication. The method generally includes: determining whether a plurality of beam configurations are different than a first beam configuration for transmission of at least one CSI-RS; selecting a second beam configuration for the transmission of the at least one CSI-RS based on the determination; and transmitting, to a UE, the at least one CSI-RS based on the selected second beam configuration.

Certain aspects of the subject matter described in this disclosure can be implemented in an apparatus for wireless communication by a UE. The apparatus generally includes a memory and one or more processors coupled to the memory, the memory and the one or more processors being configured to: determine whether a plurality of beam configurations configured for processing one or more DL signals are different than a first beam configuration for processing at least one CSI-RS, the one or more DL signals to be received in the same symbol as the at least one CSI-RS; select a second beam configuration for processing the at least one CSI-RS based on the determination; receive the at least one CSI-RS; and process the at least one CSI-RS based on the selected second beam configuration.

Certain aspects of the subject matter described in this disclosure can be implemented in an apparatus for wireless communication by a UE. The apparatus generally includes a memory and one or more processors coupled to the memory, the memory and the one or more processors being configured to: receiving an indication of a plurality of beam configurations; determining whether the plurality of beam configurations are different than a first beam configuration for processing at least one CSI-RS; selecting a second beam configuration for processing the at least one CSI-RS based on the determination; receiving the at least one CSI-RS; and processing the at least one CSI-RS based on the selected second beam configuration.

Certain aspects of the subject matter described in this disclosure can be implemented in an apparatus for wireless communication. The apparatus generally includes a memory and one or more processors coupled to the memory, the memory and the one or more processors being configured to: determine whether a plurality of beam configurations configured for transmission of one or more DL signals are different than a first beam configuration for transmission of at least one CSI-RS, the one or more DL signals to be transmitted in the same symbol as the at least one CSI-RS; select a second beam configuration for transmission of the at least one CSI-RS based on the determination; and transmit, to a UE, the at least one CSI-RS based on the selected second beam configuration.

Certain aspects of the subject matter described in this disclosure can be implemented in an apparatus for wireless communication. The apparatus generally includes a memory and one or more processors coupled to the memory, the memory and the one or more processors being configured to: determine whether a plurality of beam configurations are different than a first beam configuration for transmission of at least one CSI-RS; select a second beam configuration for the transmission of the at least one CSI-RS based on the determination; and transmit, to a UE, the at least one CSI-RS based on the selected second beam configuration.

Certain aspects of the subject matter described in this disclosure can be implemented in an apparatus for wireless communication by a UE. The apparatus generally includes: means for determining whether a plurality of beam configurations configured for processing one or more DL signals are different than a first beam configuration for processing at least one CSI-RS, the one or more DL signals to be received in the same symbol as the at least one CSI-RS; means for selecting a second beam configuration for processing the at least one CSI-RS based on the determination; means for receiving the at least one CSI-RS; and means for processing the at least one CSI-RS based on the selected second beam configuration.

Certain aspects of the subject matter described in this disclosure can be implemented in an apparatus for wireless communication by a UE. The apparatus generally includes: means for receiving an indication of a plurality of beam configurations; means for determining whether the plurality of beam configurations are different than a first beam configuration for processing at least one CSI-RS; means for selecting a second beam configuration for processing the at least one CSI-RS based on the determination; means for receiving the at least one CSI-RS; and processing the at least one CSI-RS based on the selected second beam configuration.

Certain aspects of the subject matter described in this disclosure can be implemented in an apparatus for wireless communication. The apparatus generally includes: means for determining whether a plurality of beam configurations configured for transmission of one or more downlink (DL) signals are different than a first beam configuration for transmission of at least one CSI-RS, the one or more DL signals to be transmitted in the same symbol as the at least one CSI-RS; means for selecting a second beam configuration for transmission of the at least one CSI-RS based on the determination; and means for transmitting, to a UE, the at least one CSI-RS based on the selected second beam configuration.

Certain aspects of the subject matter described in this disclosure can be implemented in an apparatus for wireless communication. The apparatus generally includes: means for determining whether a plurality of beam configurations are different than a first beam configuration for transmission of at least one CSI-RS; means for selecting a second beam configuration for the transmission of the at least one CSI-RS based on the determination; and means for transmitting, to a UE, the at least one CSI-RS based on the selected second beam configuration.

Certain aspects of the subject matter described in this disclosure can be implemented in a non-transitory computer-readable medium having instructions stored thereon to cause a UE to: determine whether a plurality of beam configurations configured for processing one or more downlink (DL) signals are different than a first beam configuration for processing at least one CSI-RS, the one or more DL signals to be received in the same symbol as the at least one CSI-RS; select a second beam configuration for processing the at least one CSI-RS based on the determination; receive the at least one CSI-RS; and process the at least one CSI-RS based on the selected second beam configuration.

Certain aspects of the subject matter described in this disclosure can be implemented in a non-transitory computer-readable medium having instructions stored thereon to cause a UE to: receive an indication of a plurality of beam configurations; determine whether the plurality of beam configurations are different than a first beam configuration for processing at least one CSI-RS; select a second beam configuration for processing the at least one CSI-RS based on the determination; receive the at least one CSI-RS; and process the at least one CSI-RS based on the selected second beam configuration.

Certain aspects of the subject matter described in this disclosure can be implemented in a non-transitory computer-readable medium having instructions stored thereon to cause an apparatus to: determine whether a plurality of beam configurations configured for transmission of one or more DL signals are different than a first beam configuration for transmission of at least one CSI-RS, the one or more DL signals to be transmitted in the same symbol as the at least one CSI-RS; select a second beam configuration for transmission of the at least one CSI-RS based on the determination; and transmit, to a UE, the at least one CSI-RS based on the selected second beam configuration.

Certain aspects of the subject matter described in this disclosure can be implemented in a non-transitory computer-readable medium having instructions stored thereon to cause an apparatus to: determine whether a plurality of beam configurations are different than a first beam configuration for transmission of at least one CSI-RS; select a second beam configuration for the transmission of the at least one CSI-RS based on the determination; and transmit, to a UE, the at least one CSI-RS based on the selected second beam configuration.

Certain aspects of the subject matter described in this disclosure can be implemented in a method for wireless communication by a UE. The method generally includes determining whether a plurality of TCI states configured for processing one or more DL signals are different than a TCI state for processing at least one CSI-RS, the one or more DL signals to be received in the same symbol as the at least one CSI-RS; selecting the TCI state for processing the at least one CSI-RS based on the determination; receiving the at least one CSI-RS; and processing the at least one CSI-RS based on the selected TCI state.

Certain aspects of the subject matter described in this disclosure can be implemented in a method for wireless communication by a UE. The method generally includes receiving a TCI codepoint mapped to a plurality of TCI states; determining whether the plurality of TCI states are different than a TCI state for processing at least one CSI-RS; selecting the TCI state for processing the at least one CSI-RS based on the determination; receiving the at least one CSI-RS; and processing the at least one CSI-RS based on the selected TCI state.

Certain aspects of the subject matter described in this disclosure can be implemented in a method for wireless communication. The method generally includes determining whether a plurality of TCI states configured for transmission of one or more DL signals are different than a TCI state for transmission of at least one CSI-RS, the one or more DL signals to be transmitted in the same symbol as the at least one CSI-RS; selecting the TCI state for transmission of the at least one CSI-RS based on the determination; and transmitting the at least one CSI-RS based on the selected TCI state.

Certain aspects of the subject matter described in this disclosure can be implemented in a method for wireless communication. The method generally includes determining whether a plurality of TCI states mapped to a TCI codepoint are different than a TCI state for transmission of at least one CSI-RS; selecting the TCI state for the transmission of the at least one CSI-RS based on the determination; and transmitting the at least one CSI-RS based on the selected TCI state.

Certain aspects of the subject matter described in this disclosure can be implemented in an apparatus for wireless communication by a UE. The apparatus generally includes a memory and one or more processors coupled to the memory, the memory and the one or more processors being configured to: determine whether a plurality of TCI states configured for processing one or more DL signals are different than a TCI state for processing at least one CSI-RS, the one or more DL signals to be received in the same symbol as the at least one CSI-RS; select the TCI state for processing the at least one CSI-RS based on the determination; receive the at least one CSI-RS; and process the at least one CSI-RS based on the selected TCI state.

Certain aspects of the subject matter described in this disclosure can be implemented in an apparatus for wireless communication by a UE. The apparatus generally includes a memory and one or more processors coupled to the memory, the memory and the one or more processors being configured to: receive a TCI codepoint mapped to a plurality of TCI states; determine whether the plurality of TCI states are different than a TCI state for processing at least one CSI-RS; select the TCI state for processing the at least one CSI-RS based on the determination; receive the at least one CSI-RS; and process the at least one CSI-RS based on the selected TCI state.

Certain aspects of the subject matter described in this disclosure can be implemented in an apparatus for wireless communication. The apparatus generally includes a memory and one or more processors coupled to the memory, the memory and the one or more processors being configured to: determine whether a plurality of TCI states configured for transmission of one or more DL signals are different than a TCI state for transmission of at least one CSI-RS, the one or more DL signals to be transmitted in the same symbol as the at least one CSI-RS; select the TCI state for transmission of the at least one CSI-RS based on the determination; and transmit the at least one CSI-RS based on the selected TCI state.

Certain aspects of the subject matter described in this disclosure can be implemented in an apparatus for wireless communication. The apparatus generally includes a memory and one or more processors coupled to the memory, the memory and the one or more processors being configured to: determine whether a plurality of TCI states mapped to a TCI codepoint are different than a TCI state for transmission of at least one CSI-RS; select the TCI state for the transmission of the at least one CSI-RS based on the determination; and transmit the at least one CSI-RS based on the selected TCI state.

Certain aspects of the subject matter described in this disclosure can be implemented in an apparatus for wireless communication by a UE. The method generally includes means for determining whether a plurality of TCI states configured for processing one or more downlink (DL) signals are different than a TCI state for processing at least one CSI-RS, the one or more DL signals to be received in the same symbol as the at least one CSI-RS; means for selecting the TCI state for processing the at least one CSI-RS based on the determination; means for receiving the at least one CSI-RS; and means for processing the at least one CSI-RS based on the selected TCI state.

Certain aspects of the subject matter described in this disclosure can be implemented in an apparatus for wireless communication by a UE. The method generally includes means for receiving a TCI codepoint mapped to a plurality of TCI states; means for determining whether the plurality of TCI states are different than a TCI state for processing at least one CSI-RS; selecting the TCI state for processing the at least one CSI-RS based on the determination; means for receiving the at least one CSI-RS; and means for processing the at least one CSI-RS based on the selected TCI state.

Certain aspects of the subject matter described in this disclosure can be implemented in an apparatus for wireless communication. The method generally includes means for determining whether a plurality of TCI states configured for transmission of one or more DL signals are different than a TCI state for transmission of at least one CSI-RS, the one or more DL signals to be transmitted in the same symbol as the at least one CSI-RS; means for selecting the TCI state for transmission of the at least one CSI-RS based on the determination; and means for transmitting the at least one CSI-RS based on the selected TCI state.

Certain aspects of the subject matter described in this disclosure can be implemented in an apparatus for wireless communication. The method generally includes means for determining whether a plurality of TCI states mapped to a TCI codepoint are different than a TCI state for transmission of at least one CSI-RS; means for selecting the TCI state for the transmission of the at least one CSI-RS based on the determination; and means for transmitting the at least one CSI-RS based on the selected TCI state.

Certain aspects of the subject matter described in this disclosure can be implemented in a computer readable medium having instructions stored thereon to cause a UE to determine whether a plurality of TCI states configured for processing one or more DL signals are different than a TCI state for processing at least one CSI-RS, the one or more DL signals to be received in the same symbol as the at least one CSI-RS; select the TCI state for processing the at least one CSI-RS based on the determination; receive the at least one CSI-RS; and process the at least one CSI-RS based on the selected TCI state.

Certain aspects of the subject matter described in this disclosure can be implemented in a computer readable medium having instructions stored thereon to cause a UE to receive a TCI codepoint mapped to a plurality of TCI states; determine whether the plurality of TCI states are different than a TCI state for processing at least one CSI-RS; select the TCI state for processing the at least one CSI-RS based on the determination; receive the at least one CSI-RS; and process the at least one CSI-RS based on the selected TCI state.

Certain aspects of the subject matter described in this disclosure can be implemented in a computer readable medium having instructions stored thereon to cause an apparatus to determine whether a plurality of TCI states configured for transmission of one or more DL signals are different than a TCI state for transmission of at least one CSI-RS, the one or more DL signals to be transmitted in the same symbol as the at least one CSI-RS; select the TCI state for transmission of the at least one CSI-RS based on the determination; and transmit the at least one CSI-RS based on the selected TCI state.

Certain aspects of the subject matter described in this disclosure can be implemented in a computer readable medium having instructions stored thereon to cause an apparatus to determine whether a plurality of TCI states mapped to a TCI codepoint are different than a TCI state for transmission of at least one CSI-RS; select the TCI state for the transmission of the at least one CSI-RS based on the determination; and transmit the at least one CSI-RS based on the selected TCI state.

In one aspect of the present disclosure, a method of wireless communications by a UE includes determining a spatial filter reception for aperiodic channel state information reference signal (AP CSI-RS) processing when a scheduling offset is less than a beam switch latency threshold, which is defined in a case of different numerologies between a scheduling physical downlink control channel (PDCCH) and a scheduled AP CSI-RS and when different control resource set (CORESET) pool indexes are configured among CORESETs.

In another aspect of the present disclosure, a method of wireless communications by a UE includes reporting a capability to support an offset between scheduling downlink control information (DCI) and a scheduled AP CSI-RS as less than a beam switch latency threshold when different control resource set CORESET indexes are configured among CORESETs.

In another aspect of the present disclosure, a method of wireless communications by a UE includes receiving a flag specifying that an offset between scheduling DCI and a scheduled AP CSI-RS is allowed to be less than a beam switch latency threshold when different CORESET indexes are configured among CORESETs.

In another aspect of the present disclosure, a UE for wireless communications, includes means for determining a spatial filter reception for AP CSI-RS processing when a scheduling offset is less than a beam switch latency threshold, which is defined in a case of different numerologies between a scheduling PDCCH and a scheduled AP CSI-RS and when different CORESET pool indexes are configured among CORESETs. The UE also include means for communicating in accordance with the determining.

In still yet another aspect of the present disclosure, a UE for wireless communications includes means for reporting a capability to support an offset between scheduling DCI and a scheduled AP CSI-RS as less than a beam switch latency threshold when different control resource set CORESET indexes are configured among CORESETs. The UE also include means for communicating in accordance with the reporting.

In another aspect of the present disclosure, a UE for wireless communications, includes means for receiving a flag specifying that an offset between scheduling DCI and a scheduled AP CSI-RS is allowed to be less than a beam switch latency threshold when different CORESET indexes are configured among CORESETs. The UE also include means for communicating in accordance with the receiving.

In another aspect of the present disclosure, a UE for wireless communications includes a memory couple to at least one processor configured to determine a spatial filter reception for AP CSI-RS processing when a scheduling offset is less than a beam switch latency threshold, which is defined in a case of different numerologies between a scheduling PDCCH and a scheduled AP CSI-RS and when different CORESET pool indexes are configured among CORESETs.

In a further aspect of the present disclosure, a UE for wireless communications includes a memory and at least one processor configured to report a capability to support an offset between scheduling DCI and a scheduled AP CSI-RS as less than a beam switch latency threshold when different control resource set CORESET indexes are configured among CORESETs.

In another aspect of the present disclosure, a UE for wireless communications includes a memory and at least one processor configured to receive a flag specifying that an offset between scheduling DCI and a scheduled AP CSI-RS is allowed to be less than a beam switch latency threshold when different control resource In another aspect of the present disclosure, a non-transitory computer-readable medium having program code recorded thereon is disclosed. The program code is executed by a UE and includes program code to determine a spatial filter reception for AP CSI-RS processing when a scheduling offset is less than a beam switch latency threshold, which is defined in a case of different numerologies between a scheduling PDCCH and a scheduled AP CSI-RS and when different CORESET pool indexes are configured among CORESETs.

In a further aspect of the present disclosure, a non-transitory computer-readable medium having program code recorded thereon is disclosed. The program code is executed by a UE and includes program code to report a capability to support an offset between scheduling DCI and a scheduled AP CSI-RS as less than a beam switch latency threshold when different control resource set CORESET indexes are configured among CORESETs.

In another aspect of the present disclosure, a non-transitory computer-readable medium having program code recorded thereon is disclosed. The program code is executed by a UE and includes program code to receive a flag specifying that an offset between scheduling DCI and a scheduled AP CSI-RS is allowed to be less than a beam switch latency threshold when different CORESET indexes are configured among CORESETs.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
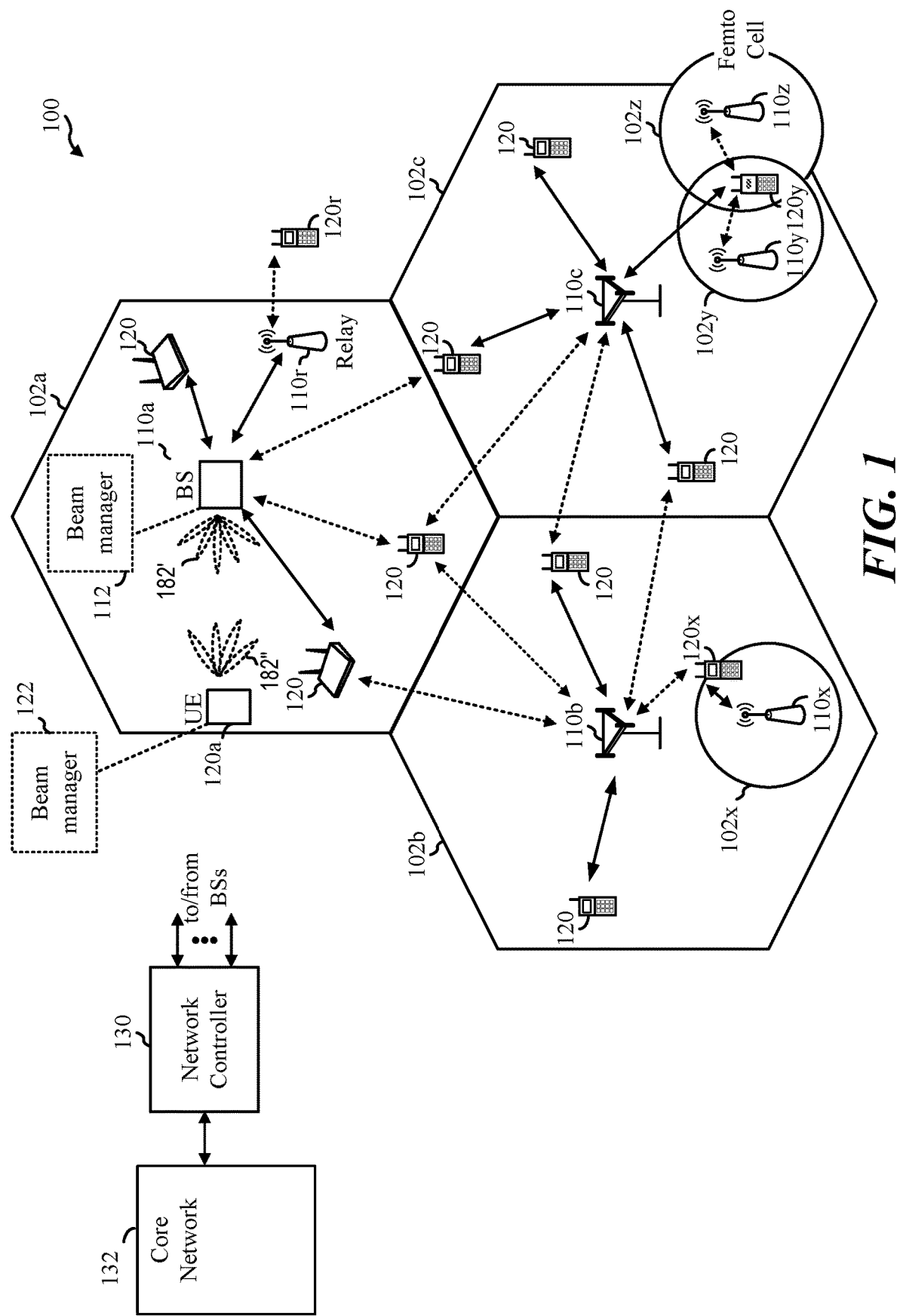
FIG. 1 is a block diagram conceptually illustrating an example telecommunications system, in accordance with certain aspects of the present disclosure.

Aspects of the present disclosure provide apparatus, methods, processing systems, and computer readable mediums for beam configuration (e.g., transmission configuration indicator (TCI) state or quasi-co location (QCL) assumption) selection to process a channel station information-reference signal (CSI-RS). For example, a time offset between reception of downlink control information (DCI) scheduling resources for the CSI-RS and the scheduled transmission time of the CSI-RS itself may be less than a beam switching threshold of the UE. The beam switching generally refers to the amount of time it takes for the UE to switch beams for transmission. The DCI may indicate a beam configuration to be used for processing the CSI-RS. However, due to the offset being less than the beam switching threshold, the UE may be unable to receive the CSI-RS using the DCI configured beam configuration.

In one or more examples, the UE may have configured rules for selecting a beam configuration in order to process the CSI-RS when the time offset between reception of the DCI and CSI-RS is less than the beam switching threshold of the UE. The selection of the beam configuration may be dependent on whether the CSI-RS is included in one or more symbols along with other DL signaling (e.g., a physical downlink shared channel (PDSCH) or another CSI-RS). If so, the UE may select the beam configuration for processing the CSI-RS based on beam configuration of the other DL signaling. In this case, the selection of the beam configuration may be based on whether one of the beam configurations (e.g., TCI states) of the other DL signaling matches the beam configuration (e.g., TCI state) of the CSI-RS.

In one or more examples, if the CSI-RS is not included in one or more symbols along with other DL signaling, the UE may select one of beam configurations mapped to a codepoint received in a message (e.g., medium access control (MAC)-control element (CE)) from the base station. The codepoint may be mapped to multiple beam configurations (e.g., TCI states) The beam configuration selection may be based on whether one of the beam configurations mapped to the codepoint matches the beam configuration of the CSI-RS.

The aspects described herein may be applied for single-DCI beam configuration or multi-DCI beam configuration. For example, as described herein, a TCI codepoint of a DCI may indicate multiple beam configurations for the single-DCI based implementation. For the multi-DCI implementation, multiple control resource sets (CORSETs) may be used to configure beam configuration, as described in more detail herein.

The following description provides examples of beam configuration selection in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for beam configuration selection for processing CSI-RS. As shown in FIG. 1, the BS 110a includes a beam manager 112. The beam manager 112 may be configured to select a beam configuration for transmitting a CSI-RS, in accordance with aspects of the present disclosure. As shown in FIG. 1, the UE 120a includes a beam manager 122. The beam manager 122 may be configured to select a beam configuration for processing the CSI-RS, in accordance with aspects of the present disclosure.

Communications using the mmWave/near mmWave radio frequency band (e.g., 3 GHz-300 GHz) may have higher path loss and a shorter range compared to lower frequency communications. Accordingly, in FIG. 1, mmWave base station 110 may utilize beamforming 182 with the UE 120 to improve path loss and range. To do so, base station 110 and the UE 120 may each include a plurality of antennas, such as antenna elements, antenna panels, and/or antenna arrays to facilitate the beamforming.

In some cases, base station 110 may transmit a beamformed signal to UE 120 in one or more transmit directions 182'. UE 120 may receive the beamformed signal from the base station 110 in one or more receive directions 182". UE 120 may also transmit a beamformed signal to the base station 110 in one or more transmit directions 182". Base station 110 may receive the beamformed signal from UE 120 in one or more receive directions 182'. Base station 110 and UE 120 may then perform beam training to determine the best receive and transmit directions for each of base station 110 and UE 120. Notably, the transmit and receive directions for base station 110 may or may not be the same. Similarly, the transmit and receive directions for UE 120 may or may not be the same.

Figure 2:
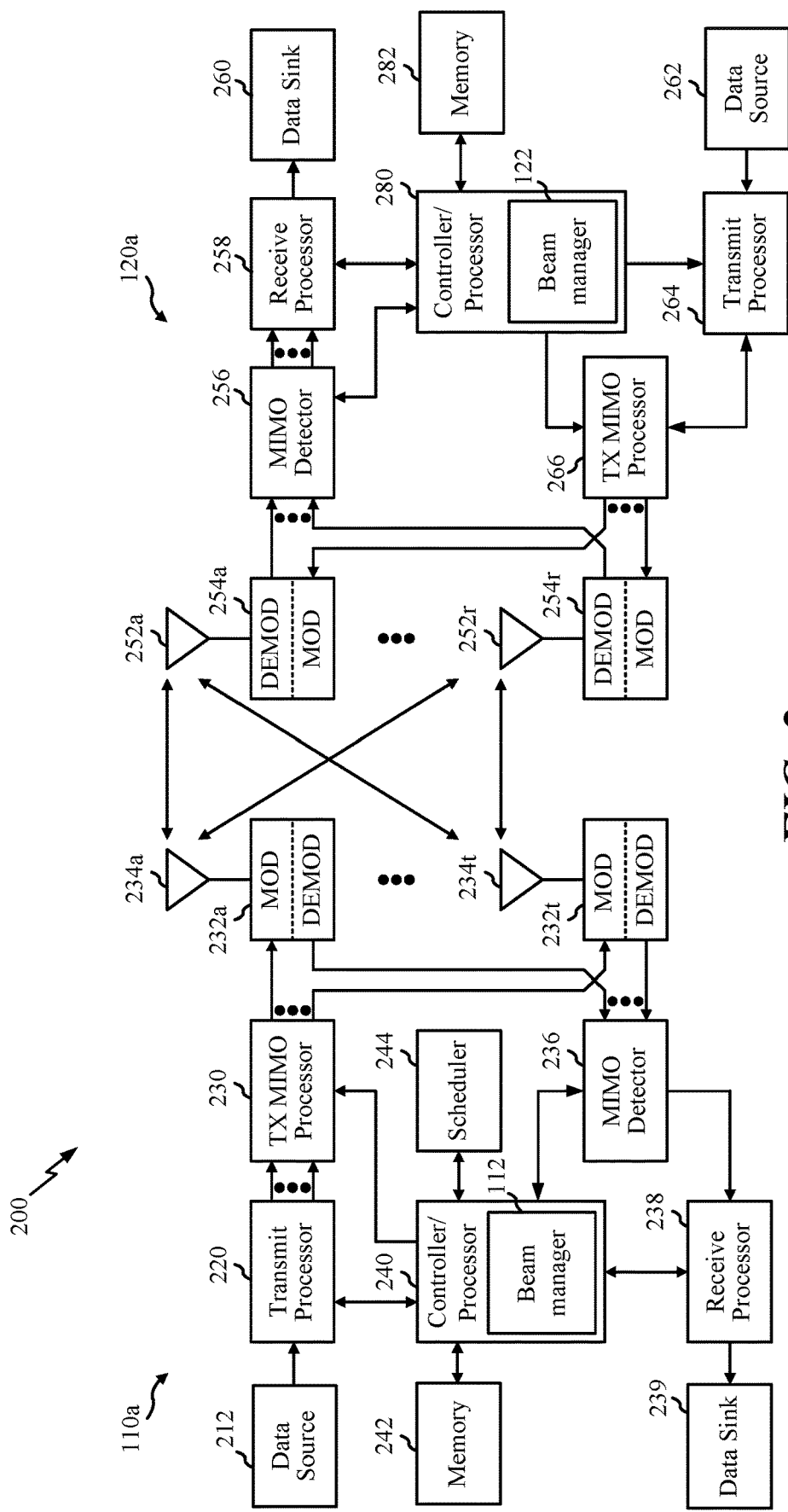
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a- 254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has the beam manager 112, according to aspects described herein. As shown in FIG. 2, the controller/processor 280 of the UE 120a has the beam manager 122, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Figure 3:
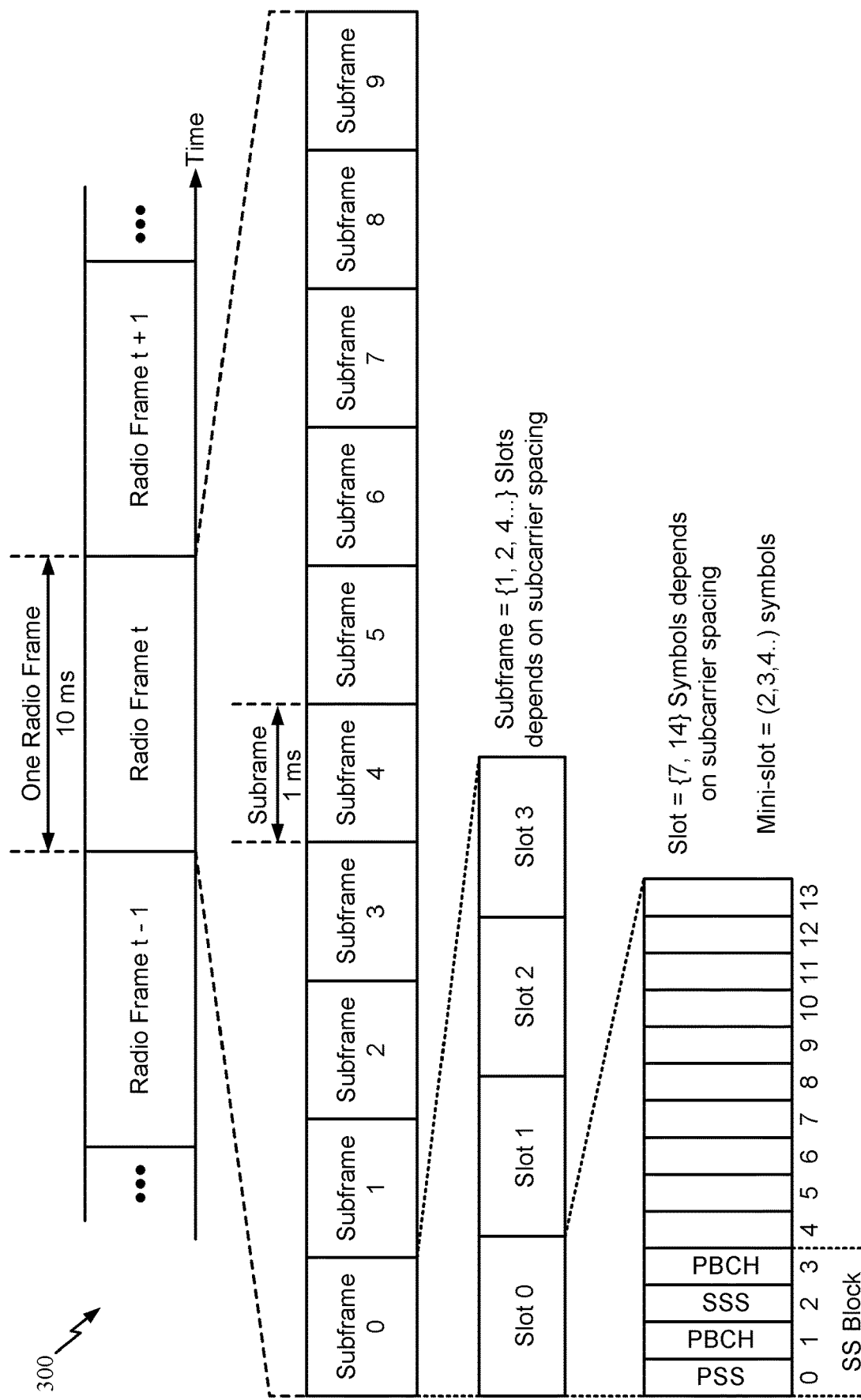
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In some cases, quasi-co location (QCL) assumptions for receptions/transmissions of signals and channels may be signaled via a mechanism referred to as Transmission Configuration Indication (TCI) states. The QCL assumptions may be grouped into different types that correspond to the parameters that may be assumed quasl-co located for a set of quasl-co located signals. For example, for a set of quasl-co located signals, Type A may indicate that Doppler shift, Doppler spread, average delay, delay spread can be assumed quasl-co located, while Type B may indicate only Doppler shift and Doppler spread, and Type C may indicate a still different set of parameters. In some cases, spatial QCL assumptions may be indicated, for example, by Type D. Spatial QCL may mean a (Tx or Rx) beam selected based on a certain signal measurement may be applied to the QCL related signal.

Introduction on Channel State Information (CSI) Reporting

Channel state information (CSI) may refer to channel properties of a communications link. The CSI may represent the combined effects of, for example, scattering, fading, and power decay with distance between a transmitter and receiver. Channel estimation using pilots, such as CSI reference signals (CSI-RS), may be performed to determine these channels' effects. CSI may be used to adapt transmissions based on the current channel conditions, which is useful for achieving reliable communication, in particular, with high data rates in multi-antenna systems. CSI is typically estimated at the receiver, quantized, and fed back to the transmitter.

A UE (e.g., such as a UE 120a) may be configured by a base station (BS) (e.g., such as a BS 110) for CSI reporting. The BS may configure the UE with a CSI reporting configuration or with multiple CSI report configurations. The BS may provide the CSI reporting configuration to the UE via higher layer signaling, such as radio resource control (RRC) signaling (e.g., via a CSI-ReportConfig information element (IE)).

Each CSI report configuration may be associated with a single downlink bandwidth part (BWP). The CSI report setting configuration may define a CSI reporting band as a subset of subbands of the BWP. The associated DL BWP may be indicated by a higher layer parameter (e.g., bwp-Id) in the CSI report configuration for channel measurement and contains parameter(s) for one CSI reporting band, such as codebook configuration, time-domain behaviour, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting that have the same DL BWP.

The CSI report configuration may configure the time and frequency resources used by the UE to report CSI. For example, the CSI report configuration may be associated with CSI-RS resources for channel measurement (CM), interference measurement (IM), or both. The CSI report configuration may configure CSI-RS resources for measurement (e.g., via a CSI-ResourceConfig IE). The CSI-RS resources provide the UE with the configuration of CSI-RS ports, or CSI-RS port groups, mapped to time and frequency resources (e.g., resource elements (REs)).

The CSI report configuration may configure the UE for aperiodic, periodic, or semi-persistent CSI reporting. For periodic CSI, the UE may be configured with periodic CSI-RS resources. Periodic CSI and semi-persistent CSI reporting on the physical uplink control channel (PUCCH) may be triggered via RRC or a medium access control (MAC) control element (CE). For aperiodic and semi-persistent CSI on the physical uplink shared channel (PUSCH), the base station may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource. The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource.

Default Channel State Information (CSI)-Reference Signal (RS) Beam for Single-Downlink Control Information (DCI) Based Multi-Transmission Reception Point Certain aspects of the present disclosure are generally directed to the selection of a beam configuration (e.g., transmission configuration indicator (TCI) state) for processing a channel state information (CSI) reference signals (RS). As used herein, processing a CSI-RS may involve performing measurements based on the CSI-RS to be included in a CSI-report. Moreover, as used herein, a beam configuration generally refers to any TCI state or quasi-co location (QCL) assumption that may be used to configure a beam for communication. While some example techniques provided herein are described with respect to a TCI state to facilitate understanding, the aspects described herein are applicable to any beam configuration.

The beam configuration for processing the CSI-RS may be determined by a user-equipment (UE) and base station (BS) using a configured rule, as described in more detail herein. The beam configuration may be used to determine a default QCL assumption for processing the CSI-RS when the UE is unable to process a downlink (DL) control information (DCI) scheduling the CSI-RS and perform beam switching in accordance with the DCI, in time to receive the CSI-RS.

Figure 4:
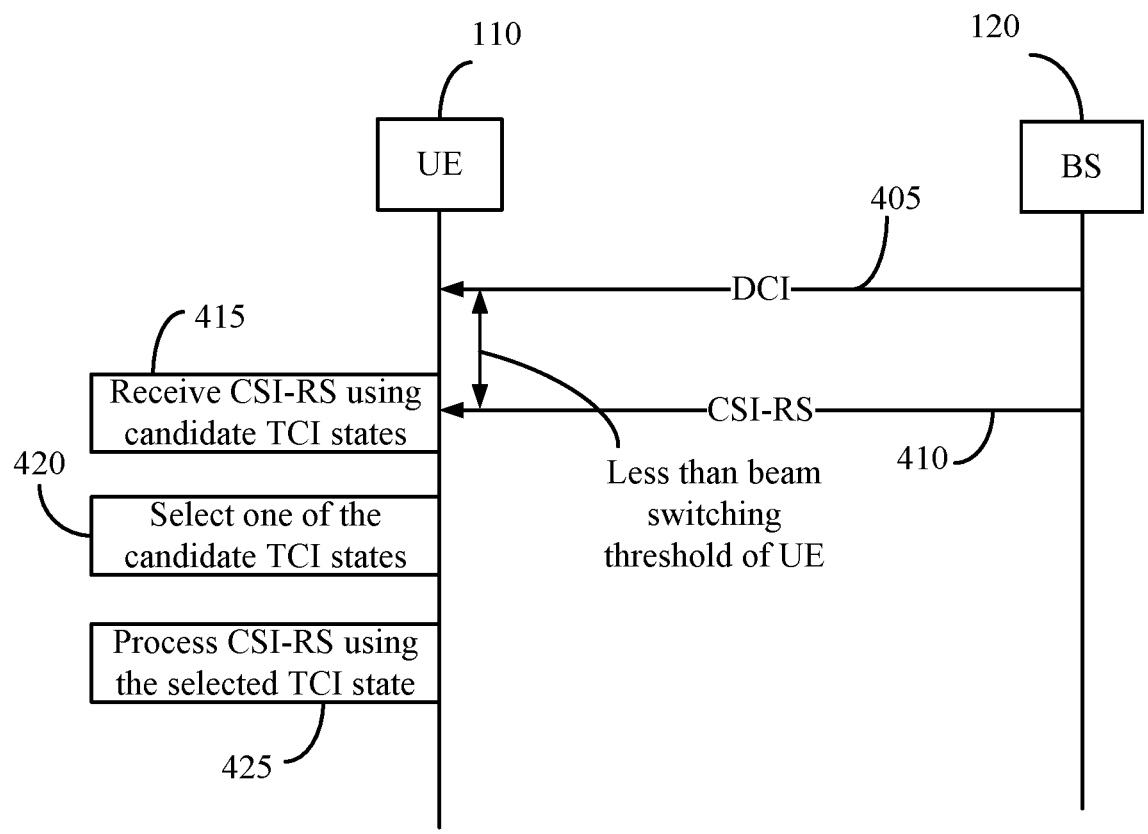
FIG. 4 illustrates a protocol for selection of a transmission configuration indicator (TCI) state for processing channel state information (CSI)-reference signal (RS), in accordance with certain aspects of the present disclosure.

FIG. 4 illustrates an example protocol for selection of a beam configuration (e.g., TCI state) for processing CSI-RS, in accordance with certain aspects of the present disclosure. As illustrated, the BS 110 may transmit DCI 405 to the UE 120. The DCI 405 may schedule resources for reception of CSI-RS 410. The DCI 405 may indicate a TCI state to be used for processing the CSI-RS 410. However, as illustrated, the offset between reception of the DCI 405 and reception of the CSI-RS 410 may be less than a beam switching threshold of the UE. Thus, at block 415, the UE 120 may receive the CSI-RS using candidate TCI states. At block 420, the UE may then select one of the candidate TCI states, and at block 425, process the CSI-RS using the selected TCI state (e.g., using the QCL assumption corresponding to the selected TCI state). In other words, the UE may perform measurements on the CSI-RS as received using the selected TCI-state, and generate a CSI-report accordingly. Certain aspects of the present disclosure provide techniques for the selection of the TCI state for processing the CSI-RS.

For single-DCI based multi-transmission reception point (mTRP), each DCI codepoint may be mapped to a combination of one or two TCI states, allowing the single DCI to configure reception for multiple TRPs. In certain aspects, if a scheduling offset between the DCI 405 that triggers an aperiodic (AP) CSI report and the indicated AP CSI-RS resource set (e.g., for CSI-RS 410) is less than a UE reported threshold (referred to as a beamSwitchTiming threshold), and if a medium access control (MAC)-control element (CE) that activates TCI states for PDSCH has at least one TCI codepoint indicating two TCI states (e.g., for single-DCI based mTRP), and the UE is capable of two simultaneous beam reception and two default QCL assumptions, the UE may apply certain rules for determining the TCI state to process the CSI-RS. For example, if there is any other DL signal with an indicated TCI state in the same symbols as CSI-RS 410, the UE may apply the quasi-co location (QCL) assumption of the other DL signal. In some cases, the other DL signal may be a PDSCH scheduled with offset larger than or equal to a time duration for QCL threshold (e.g., timeDurationForQCL). The time duration for QCL threshold generally refers to a minimum number of OFDM symbols required by the UE to perform PDCCH reception and applying spatial QCL information received in DCI for PDSCH processing. In other words, the time duration for QCL threshold indicates whether the UE has sufficient time to configure the QCL relationship for receiving and processing the PDSCH per the configured TCI state of the PDSCH. If the PDSCH has two TCI states (e.g., a TCI field of the DCI scheduling PDSCH indicates two TCI states), the first indicated TCI state may be used for QCL assumption for reception and processing of the CSI-RS.

In some cases, the other DL signals may include another AP CSI-RS with a scheduling offset larger than or equal to a beam switch timing threshold (e.g., beamSwitchTiming threshold). The beam switch timing threshold generally refers to the minimum number of OFDM symbols between the DCI triggering aperiodic CSI-RS and the aperiodic CSI-RS transmission. The number of OFDM symbols may be measured from the last symbol containing the indication to the first symbol of CSI-RS. The beam switch timing threshold may differ for different numerologies (e.g., subcarrier spacing). In some cases, the other DL signal may be a periodic or semi-persistent CSI-RS.

In some cases, if there are multiple DL signals with different QCL assumptions, various options may be available for determining which QCL assumption to use for processing the CSI-RS in the same symbol as the other DL signal. For example, the UE may follow the QCL assumption of PDSCH (if any), follow QCL assumption of the other AP CSI-RS (if any), or follow QCL assumption of one of periodic/semi-persistent CSI-RS(s). If there are multiple periodic or semi-persistent CSI-RSs, the QCL assumption of the lowest CSI-RS resource ID may be followed. Otherwise (e.g., if there is no other DL signals with an indicated TCI state in the same symbols as CSI-RS), the UE applies the default QCL assumption corresponding to the first TCI state of the lowest TCI codepoint that indicates two TCI states (e.g., the first default QCL assumption).

Certain aspects of the present disclosure provide rules for determining a default QCL for processing CSI-RS based on whether DL signals with indicated TCI states are in the same symbol as CSI-RS, as well as whether any of the TCI states for the other DL signal is the same as the TCI state of the CSI-RS. In other words, in case of multiple known DL signals with different TCI states in the same symbols as the AP CSI-RS, if the different TCI states include the AP CSI-RS's TCI state, the UE may process the AP CSI-RS received by its own TCI state. That is, the TCI state for one of the other DL signals that matches the TCI state for AP CSI-RS may be used, instead of using the TCI state of one of the other DL signals as determined by a certain rule.

In cases where a known DL signal is not in the same symbols as the AP CSI-RS, if the two TCI states of the lowest TCI codepoint includes the TCI state of the AP CSI-RS, the UE may process the AP CSI-RS received by its own TCI state. In other words, the default QCL assumption may be the QCL associated with the TCI state of the lowest TCI codepoint that includes (e.g., is the same as) the TCI state of the AP-CSI-RS (e.g., instead of the first TCI state).

In certain aspects, the default AP CSI-RS beam rule may consider both cases of same and different numerology triggering, which have different beam switch latency thresholds. In other words, if the DCI scheduling resources for the AP CSI-RS has a different numerology than the AP CSI-RS itself, a different beam switching latency threshold may be considered to determine whether the default QCL assumption is to be used.

Figure 5:
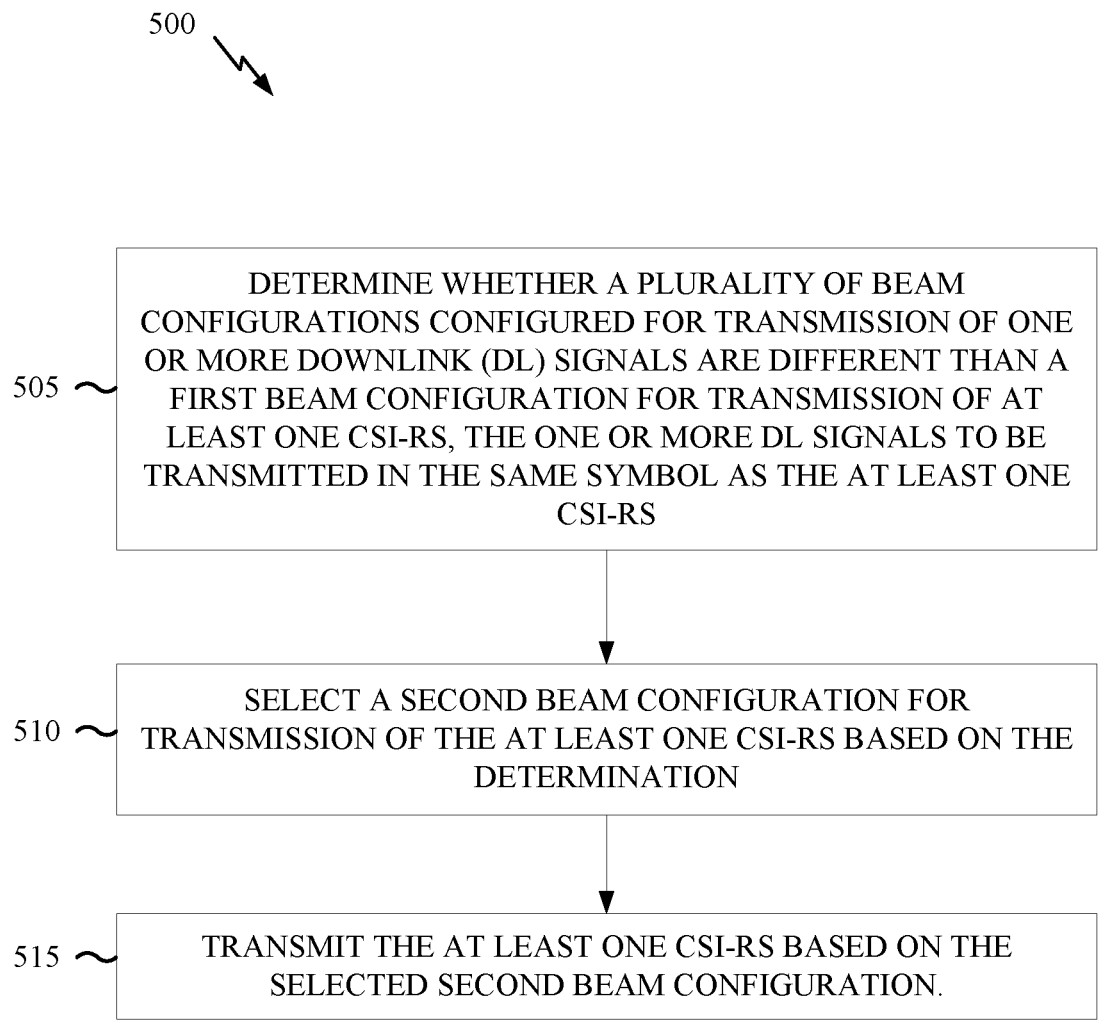
FIG. 5 is a flow diagram illustrating example operations for wireless communication, in accordance with certain aspects of the present disclosure.

FIG. 5 is a flow diagram illustrating example operations 500 for wireless communication, in accordance with certain aspects of the present disclosure. The operations 500 may be performed, for example, by a BS (e.g., such as the BS 110a in the wireless communication network 100).

Operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 500 may begin, at block 505, with the BS determining whether a plurality of beam configurations configured for transmission of one or more DL signals are different than a first beam configuration for transmission of at least one CSI-RS, the one or more DL signals to be transmitted in the same symbol as the at least one CSI-RS. As used herein, each of the plurality of beam configurations may be a QCL assumption or a TCI state. At block 510, the BS selects a second beam configuration for transmission of the at least one CSI-RS based on the determination, and at block 515, transmits the at least one CSI-RS based on the selected second beam configuration.

Figure 6:
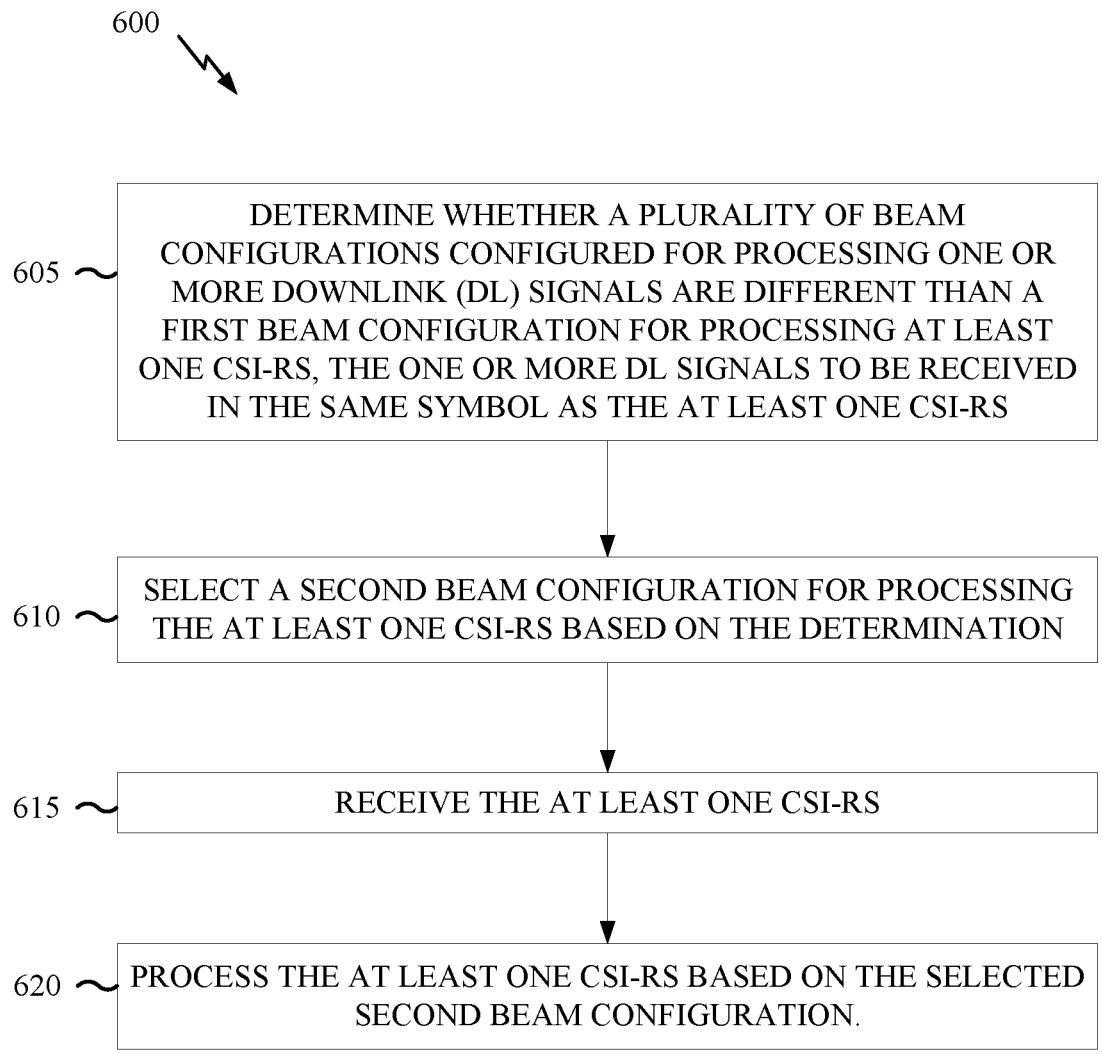
FIG. 6 is a flow diagram illustrating example operations for wireless communication, in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., such as a UE 120a in the wireless communication network 100).

The operations 600 may be complimentary operations by the UE to the operations 500 performed by the BS. Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 605, with the UE determining whether a plurality of beam configurations configured for reception of one or more DL signals are different than a first beam configuration for reception of at least one CSI-RS, the one or more DL signals to be received in the same symbol as the at least one CSI-RS. At block 610, the UE selects a second beam configuration for reception of the at least one CSI-RS based on the determination. For example, if one of the plurality of beam configurations is determined to be the same as the first beam configuration for processing the at least one CSI-RS, the one of the plurality of beam configurations may be selected as the second beam configuration for processing the at least one CSI-RS. As another example, if the plurality of beam configurations are determined to be different than the first beam configuration for processing the at least one CSI-RS, the selection of the second beam configuration for processing the at least one CSI-RS may include selecting, as the second beam configuration for processing the at least one CSI-RS, one of the plurality of beam configurations based on a policy. At block 615, the UE receives the at least one CSI-RS, and at block 620, the UE processing the at least one CSI-RS based on the selected second beam configuration.

Figure 7:
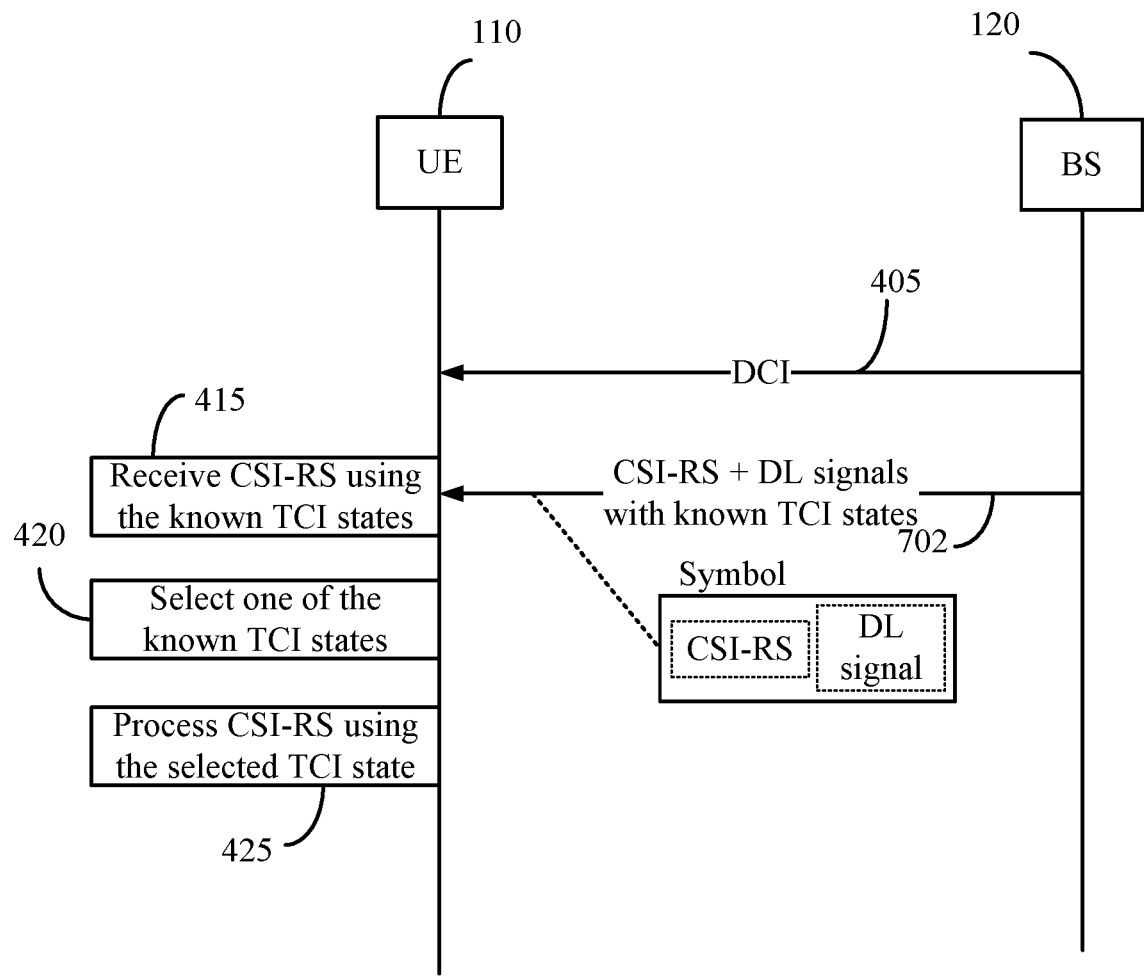
FIG. 7 illustrates a protocol for selection of a TCI state for processing CSI-RS, in accordance with certain aspects of the present disclosure.

FIG. 7 illustrates an example protocol for selection of a beam configuration (e.g., TCI state) for processing CSI-RS, in accordance with certain aspects of the present disclosure. As illustrated, one or more symbols 702 may include both the CSI-RS and one or more other DL signals that have known TCI states. For example the same symbol may include both CSI-RS and one or more DL signals, as shown. The TCI states of the one or more other DL signals may be known by the UE when the one or more symbols 702 are received. Therefore, at block 415, the UE may receive the CSI-RS using the known TCI states of the one or more other DL signals. At block 420, the UE may select one of the known TCI states (e.g., in accordance with rules described herein), and at block 425, process the CSI-RS using the selected TCI state.

For example, if the scheduling offset between the DCI (e.g., DCI 405) that triggers a AP CSI report and the indicated AP CSI-RS resource set (e.g., for CSI-RS 410) is less than the UE reported threshold (e.g., beamSwitchTiming) for same numerology triggering or beamSwitchTiming plus delay (d) (e.g., a delay to account for the different numerologies) in PDCCH symbols for different numerology triggering, and if MAC-CE that activates TCI states for PDSCH has at least one TCI codepoint indicating two TCI states (e.g., single-DCI), and the UE is capable of two simultaneous beam reception and two default QCL assumptions, and if there is any other DL signal with an indicated TCI state in the same symbols as CSI-RS, the UE applies the QCL assumption of the other DL signal.

In some cases, if the other DL signal only includes a single TCI state, the UE may process the AP CSI-RS received by the single TCI state. For example, the UE may process the AP CSI-RS received by the single TCI state regardless of if the single TCI state is identical to TCI state of AP CSI-RS.

In some cases, if the other DL signal includes multiple DL signals with different TCI states, and if the different TCI states include the indicated TCI state for the AP CSI-RS, the UE may process the AP CSI-RS received by the TCI state of the DL signal having a TCI state that is identical to the indicated TCI state for the AP CSI-RS.

In some cases, if the other DL signal includes multiple DL signals with different TCI states, and if the different TCI states do not include the indicated TCI state for the AP CSI-RS, the UE processes the AP CSI-RS received by one of the multiple TCI states per a configured rule or policy (e.g., the one with lowest/highest TCI state ID).

Certain aspects of the present disclosure are directed to techniques for processing CSI-RS when there is no other DL signals with an indicated TCI state in the same symbols as the CSI-RS.

Figure 8:
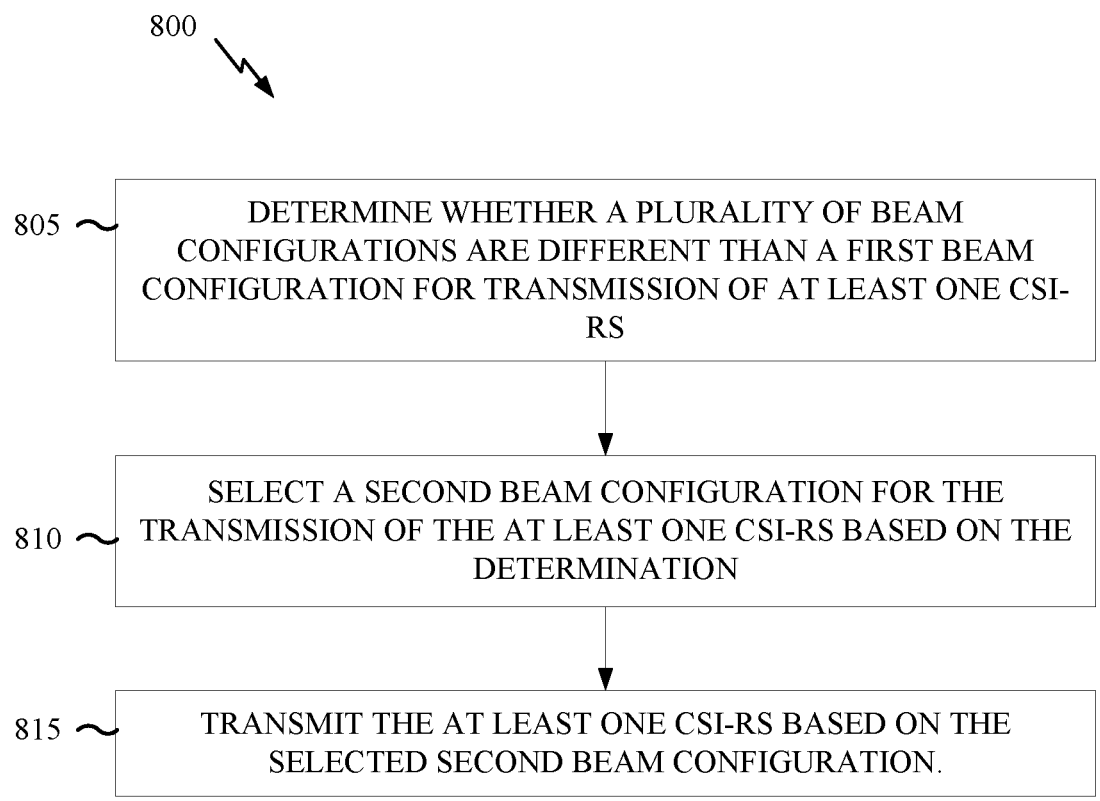
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by a BS (e.g., such as the BS 110a in the wireless communication network 100).

Operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 800 may begin, at block 805, with the BS determining whether a plurality of beam configurations are different than a first beam configuration for transmission of at least one CSI-RS. At block 810, the BS may select a second beam configuration for the transmission of the at least one CSI-RS based on the determination, and at block 815, transmit the at least one CSI-RS based on the selected second beam configuration.

Figure 9:
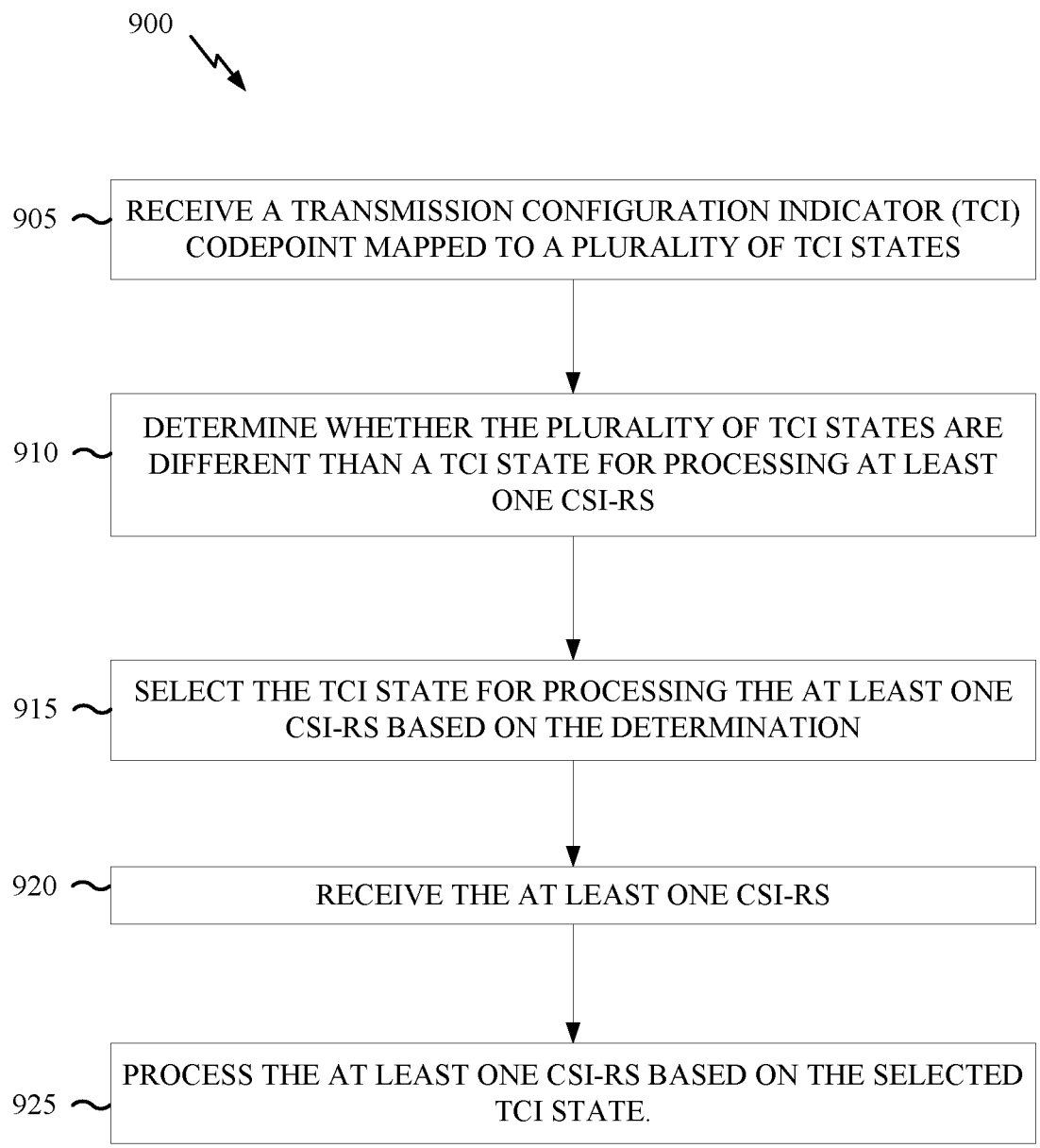
FIG. 9 is a flow diagram illustrating example operations for wireless communication, in accordance with certain aspects of the present disclosure.

FIG. 9 is a flow diagram illustrating example operations 900 for wireless communication, in accordance with certain aspects of the present disclosure. The operations 900 may be performed, for example, by UE (e.g., such as a UE 120a in the wireless communication network 100).

The operations 900 may be complimentary operations by the UE to the operations 800 performed by the BS. Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at block 905, with the UE receiving an indication of a plurality of beam configurations. At block 910, the UE determines whether the plurality of beam configurations are different than a first beam configuration for reception of at least one CSI-RS. At block 915, the UE selects a second beam configuration for processing the at least one CSI-RS based on the determination. For example, if one of the plurality of beam configurations is determined to be the same as the first beam configuration for processing the at least one CSI-RS, the one of the plurality of beam configurations is selected as the second beam configuration for processing the at least one CSI-RS. As another example, if the plurality of beam configurations are determined to be different than the first beam configuration for processing the at least one CSI-RS, the selection of the second beam configuration for processing the at least one CSI-RS may include selecting, as the second beam configuration for processing the at least one CSI-RS, one of the plurality of beam configurations based on a policy. At block 920, the UE receives the at least one CSI-RS, and at block 925, processes the at least one CSI-RS based on the selected second beam configuration.

Figure 10:
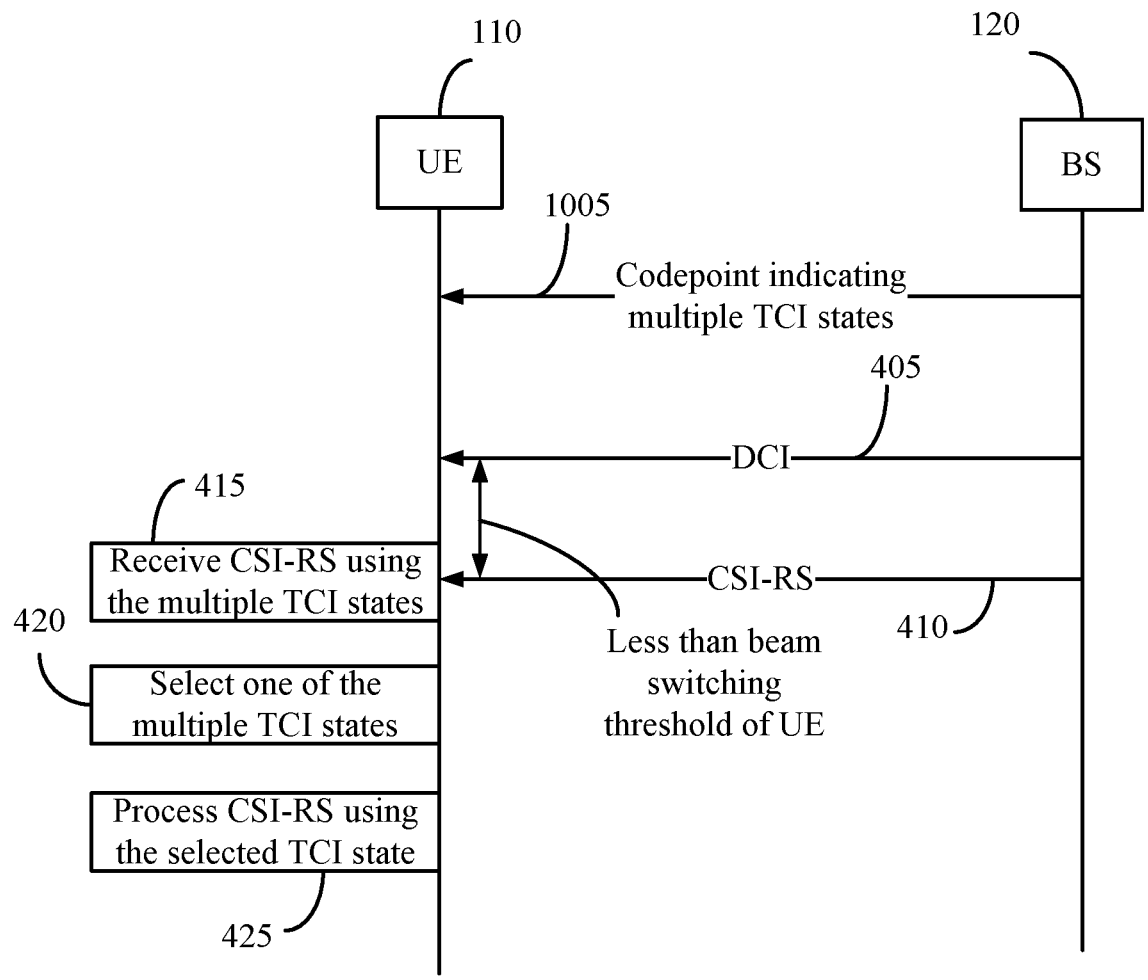
FIG. 10 illustrates a protocol for selection of a TCI state for processing CSI-RS, in accordance with certain aspects of the present disclosure.

FIG. 10 illustrates an example protocol for selection of a beam configuration (e.g., TCI state) for processing CSI-RS, in accordance with certain aspects of the present disclosure. As illustrated, the UE may receive a message 1005 (e.g., MAC-CE) having a codepoint that indicates multiple TCI states (e.g., to implement single-DCI mTRP). The message 1005 may indicate multiple codepoints that each map to multiple TCI states. At block 415, the UE may receive the CSI-RS 410 using the TCI states of the codepoint having the lowest ID of the multiple codepoints in message 1005. At block 420, the UE may select one of the TCI states (e.g., in accordance with rules described herein), and at block 425, process the CSI-RS using the selected TCI state.

For example, if there is no other DL signals with an indicated TCI state in the same symbols as CSI-RS, and if one TCI state of the lowest TCI codepoint mapped to two TCI states is identical to the indicated TCI state of the AP CSI-RS, the UE may process the AP CSI-RS received by that TCI state of the lowest TCI codepoint. As another example, if there is no other DL signals with an indicated TCI state in the same symbols as CSI-RS, and if no TCI state of the lowest TCI codepoint mapped to two TCI states is identical to the indicated TCI state of the AP CSI-RS, the UE processes the AP CSI-RS received by one TCI state of the lowest TCI codepoint. The one TCI state may be selected based on a certain rule (e.g., policy). The rule may include selecting the first or second TCI state of a codepoint (e.g., the TCI state in the first row of the codepoint or the second row of the codepoint) or selecting the TCI state with lowest or highest ID.

In certain aspects, the UE may indicate the UE's capability to support offset between scheduling DCI and AP CSI-RS to be less than the beam switch latency threshold, which is beamSwitchTiming for same numerology triggering or beamSwitchTiming plus delay (d) in PDCCH symbols for different numerology triggering. This capability may also imply to the BS that the UE supports the default AP CSI-RS beam rule, which at least includes the rule in case of single-DCI based mTRP, as described herein.

In certain aspects, the BS may send the UE a flag. If the flag is set, it means the offset between scheduling DCI and AP CSI-RS can be (are allowed to be) less than the beam switch latency threshold. Otherwise if the flag is not set, it means the offset should be equal to or greater than the beam switch latency threshold. In certain aspects, the BS may only set the flag if the UE indicates the capability of supporting offset less than threshold. The flag may be carried in DCI, MAC-CE, or radio resource control (RRC) message. In certain aspects, if the flag is set, the UE may apply the default AP CSI-RS beam rule, which at least includes the rule in case of single-DCI based mTRP, as described herein.

Default Channel State Information (CSI)-Reference Signal (RS) Beam for Multi-Downlink Control Information (DCI) Based Multi-Transmission Reception Point (mTRP)

In certain systems, transmissions may be via multiple transmission configuration indicator (TCI) states. In some examples, a TCI state is associated with a beam pair, antenna panel, antenna ports, antenna port groups, a quasi-colocation (QCL) relation, and/or a transmission reception point (TRP). Thus, multi-TCI state transmission may be associated with multiple beam pairs, multiple antenna panels, and/or multiple QCL relations that may be associated with one or more multiple TRPs (mTRPs). The TCI state indicates the QCL assumption that the UE may use for channel estimation.

Figure 11:
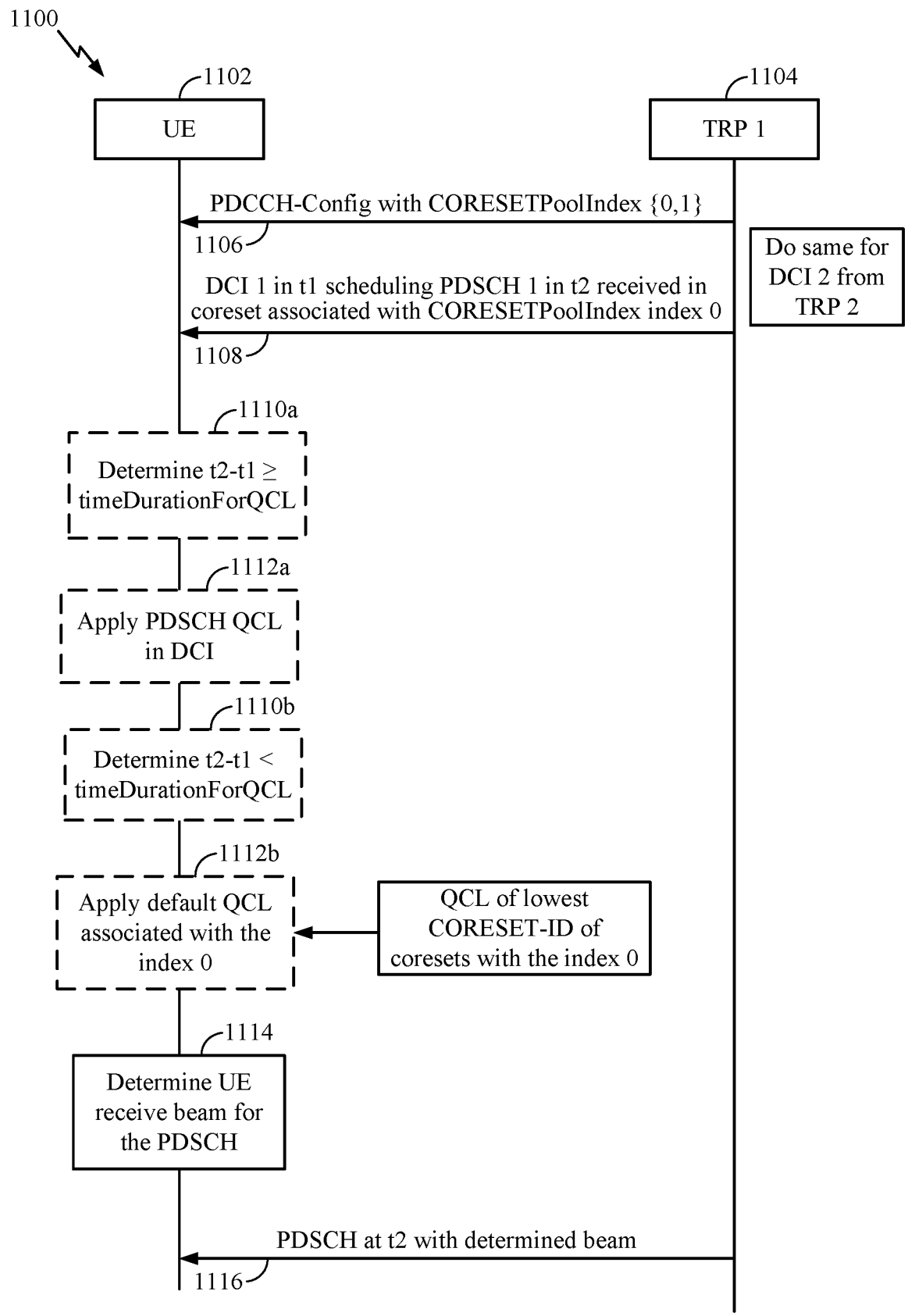
FIG. 11 is a call flow diagram illustrating example signalling for a multiple downlink control information (DCI) quasi-co location (QCL) assumption, in accordance with certain aspects of the present disclosure.

FIG. 11 is a call flow diagram illustrating example signaling 1100 for a multiple DCI (mDCI) mTRP PDSCH QCL assumption, in accordance with certain aspects of the present disclosure.

Figure 12:
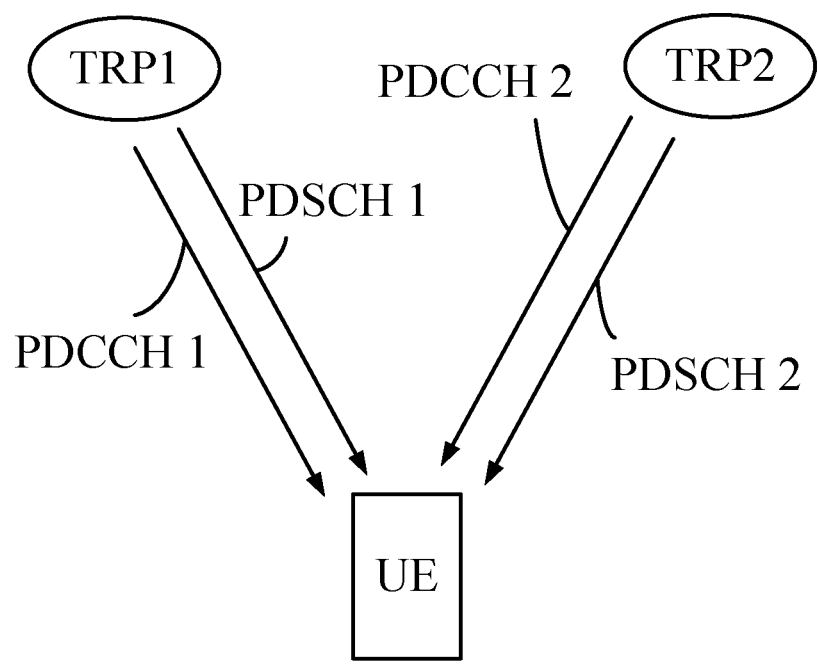
FIG. 12 illustrates multiple DCI transmissions from multiple transmission-reception points (TRPs), in accordance with certain aspects of the present disclosure.

In certain systems, PDSCH may be transmitted by multiple TRPs and scheduled by multiple DCIs. For example, as shown in FIG. 12, a first DCI (e.g., a DCI 1 or PDCCH 1) transmitted from a first TRP (e.g., TRP 1) schedules a first PDSCH (e.g., PDSCH 1) from the first TRP (e.g., TRP 1) and a second DCI (e.g., a DCI 2 or PDCCH 2) transmitted from a second TRP (e.g., TRP 2) schedules a second PDSCH (e.g., PDSCH 2) from the second TRP (e.g., TRP 2).

The TRP differentiation at the UE-side may be based on an index value associated with the DCIs. For example, the UE may receive a configuration of index values. As shown in FIG. 11, at 1106, the UE 1102 receives a configuration (e.g., a PDCCH-config RRC parameter) with the index values (e.g., CORESETPoolIndex values) from the TRP 1 1104 (or TRP 2 or both). Each control resource set (CORESET) (e.g., up to 5 CORESETs) can be configured with a value of the CORESETPoolIndex, which may be 0 or 1. Thus, the CORESETS may be separated into two groups (e.g., a group of CORESETS associated with the CORESETPoolIndex value 0 and a group of CORESETS associated with the CORESETPoolIndex value 1).

As shown in FIG. 11, at 1108, the UE 1102 receives a DCI (at t1) from the TRP 1 1104 scheduling a PDSCH (at t2). The DCI may indicate a QCL assumption (e.g., a TCI state) for the scheduled PDSCH. The DCI may be received in a CORESET associated with one of the CORESETPoolIndex values (e.g., 0 in the example shown in FIG. 11). Thus, the UE knows the CORESET and CORESETPoolIndex value associated with the DCI. The CORESETPoolIndex value of the CORESET in which the DCI is received may be used for different purposes, such as hybrid automatic repeated request (HARQ)-Ack codebook construction and transmission, PDSCH scrambling, and the like.

The UE 1102 may apply the indicated TCI state or a default QCL assumption, based on whether a time duration between the scheduled PDSCH and the DCI satisfies a threshold. For example, the threshold may be referred to as a "timeDurationForQCL" threshold. The UE 1102 may report the threshold (e.g., 14 or 28 OFDM symbols) to the TRP 1 1104 as a UE capability.

As shown in FIG. 11, if the UE 1102 determines, at 1110a, the time offset between the reception of the DCI 1 and the corresponding PDSCH is equal to or larger than the threshold (e.g., timeDurationForQCL), then the UE 1102 may apply the QCL assumption (and/or a TCI state) indicated in the DCI for the PDSCH at 1112a. For example, the UE 1102 can determine the receive beam for receiving the PDSCH based on the indicated QCL assumption (and/or a TCI state) at 1114.

If the UE 1102 determines, at 1110b, that the time offset is less than the threshold (e.g., timeDurationForQCL), then the UE 1102 applies a default QCL assumption for the PDSCH at 1112b. For example, the UE 1102 can determine the receive beam for receiving the PDSCH based on the default QCL at 1114.

The UE may maintain two default QCL assumptions corresponding to the lowest CORESET ID within each CORESET group. The two default QCL assumptions may be a UE capability, which may be conditioned on another UE capability to receive two beams simultaneously (e.g., in frequency range (FR2), a millimeter wave (mmWave) frequency range). For example, the UE may support mDCI in FR2, but not support two simultaneous beams reception and/or not support two default QCL assumptions. In the example in FIG. 11, the default QCL assumption is the QCL assumption of the lowest CORESET-ID of the CORESETS with the index value 0.

Stated otherwise, if a UE configured by higher layer parameter PDCCH-Config that contains two different values of CORESETPoolIndex in ControlResourceSet, and if the offset between the reception of the DL DCI and the corresponding PDSCH is less than the threshold timeDurationForQCL, the UE may assume that the demodulation reference signal (DM-RS) ports of PDSCH associated with a value of CORESETPoolIndex of a serving cell are quasl-co located with the RS(s) with respect to the QCL parameter(s) used for PDCCH QCL indication of the CORESET associated with a monitored search space with the lowest CORESET-ID among CORESETs. The CORESETs may be configured with the same value of CORESETPoolIndex as the PDCCH scheduling that PDSCH, and may be in the latest slot in which one or more CORESETs associated with the same value of CORESETPoolIndex as the PDCCH scheduling that PDSCH within the active BWP of the serving cell are monitored by the UE.

At 1116, the UE 1102 receives the PDSCH (at t2) from the TRP1 1104 using the determined received beam.

Figure 13:
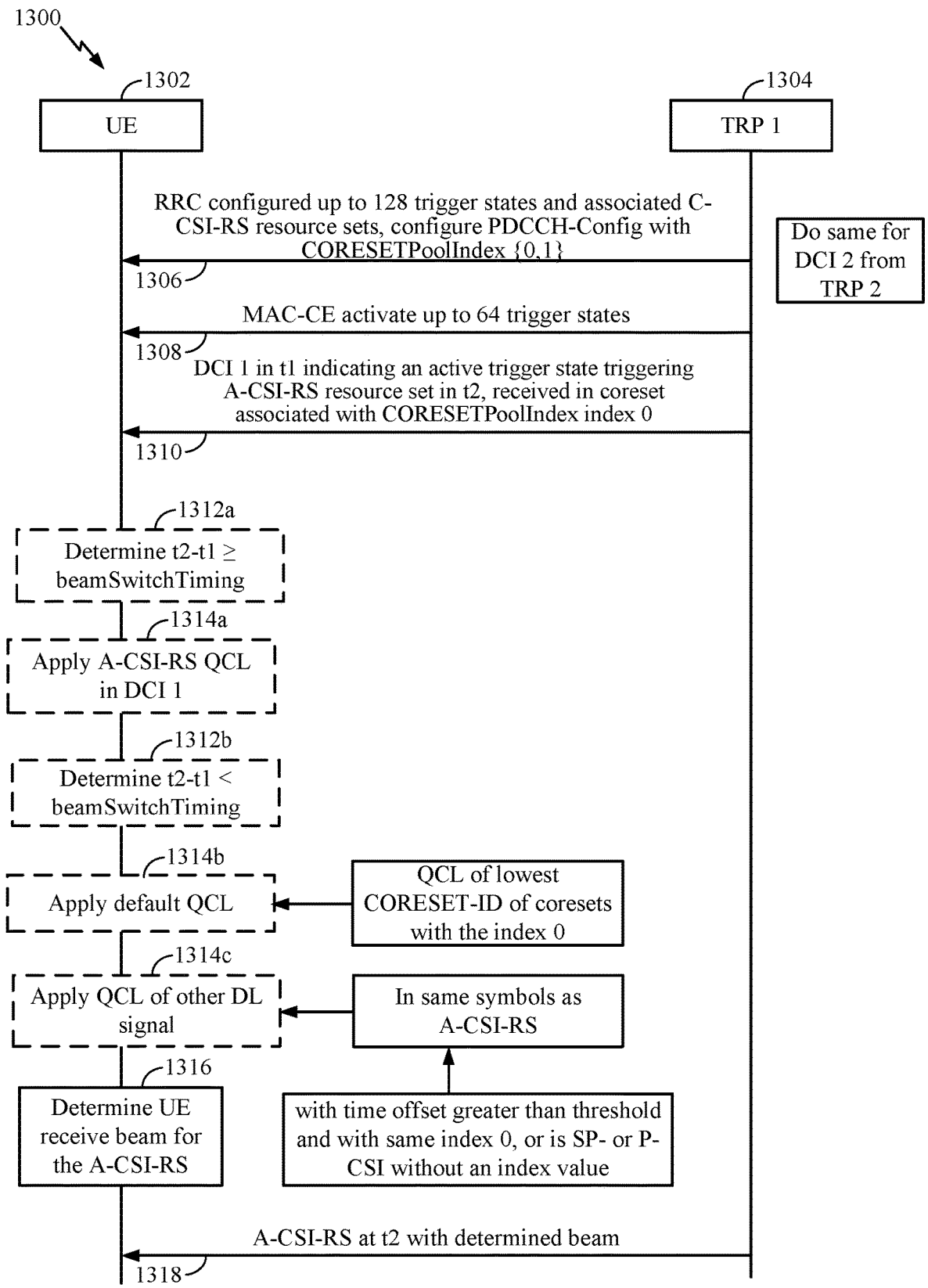
FIG. 13 is a call flow diagram illustrating example signaling for a multiple DCI multiple TRP CSI-RS QCL assumption, in accordance with certain aspects of the present disclosure.

FIG. 13 is a call flow diagram illustrating example signaling 1300 for a multiple downlink control information (mDCI) multiple transmission-reception point (mTRP) aperiodic channel state information reference signal (A-CSI-RS or AP CSI-RS) QCL assumption, in accordance with certain aspects of the present disclosure. A UE 1302 may be capable of two simultaneous beam receptions and two default QCL assumptions.

For A-CSI, a DCI may trigger a CSI report. For example, a DCI with an uplink grant may trigger the A-CSI report on a PUSCH. As shown in FIG. 13, at 1306 the UE 1302 may be configured (e.g., via radio resource control (RRC) signaling) with a set (e.g., up to 128) of trigger states. For example, the UE 1302 may be configured with the set of trigger states in a CSI reporting configuration. As shown in FIG. 13, each trigger state in the list may be linked to a CSI-RS resource set. Each CSI-RS resource set may have multiple CSI-RS resources. A QCL assumption (and/or a TCI state) for each of the CSI-RS resources may be indicated as part of a trigger state configuration. At 1308, a medium access control (MAC) control element (CE) may activate a subset (e.g., up to 64) of the configured trigger states.

The UE 1302 may be scheduled for an mDCI mTRP transmission. For example, the UE 1302 may be configured by a higher layer parameter (e.g., PDCCH-Config) that contains two different index values (e.g., CORESETPoolIndex) in two different CORESETs. As shown in FIG. 13, at 1306, the UE 1302 may also receive a configuration (e.g., the PDCCH-config RRC parameter) with the index values (e.g., CORESETPoolIndex values) from TRP 1 1304 (or TRP 2 or both). The configuration of the trigger states and index values may be done separately and/or at different times. As discussed above, each CORESET may be configured with an index value. In some example, the index values are either 0 or 1. Thus, the CORESETS may be separated into two groups (e.g., a group of CORESETS associated with the CORESETPoolIndex value 0 and a group of CORESETS associated with the CORESETPoolIndex value 1).

At 1310, the UE 1302 may receive a DCI (at t1) from the TRP 1 1304 triggering A-CSI-RS (at t2). The DCI may indicate one of the active trigger states. It takes time for the UE 1302 to switch its beam to receive the A-CSI-RS (e.g., to the beam indicated by the QCL assumption (and/or a TCI state) associated with the CSI-RS resource set triggered by the DCI). The UE 1302 may apply the indicated QCL assumption (and/or a TCI state) or a default QCL assumption, based on whether a time duration between the A-CSI-RS and the DCI satisfies a threshold. For example, the threshold may be a "beamSwitchTiming" threshold. The UE 1302 may report the threshold to the TRP 1304 as a UE capability.

As shown in FIG. 13, the DCI, received at 1310, may indicate a TCI state for the scheduled A-CSI-RS. The DCI may be received in a CORESET associated with one of the index values (e.g., index value 0 in the example shown in FIG. 13). Thus, the UE 1302 knows the CORESET and index value associated with the DCI. The index value of the CORESET in which the DCI is received may be used for different purposes, such as hybrid automatic repeated request (HARQ)-Ack codebook construction and transmission, PDSCH scrambling, and the like.

As shown in FIG. 13, if the UE 1302 determines, at 1312a, the time offset between the reception of the DCI and the corresponding A-CSI-RS is equal to or larger than the threshold (e.g., beamSwitchTiming), then the UE 1302 may apply the QCL assumption (and/or a TCI state) indicated in the DCI for the A-CSI-RS at 1314a. For example, the UE 1302 can determine the receive beam for receiving the A-CSI-RS based on the indicated QCL assumption (and/or a TCI state) at 1316.

If the scheduling offset between the DCI that triggers the A-CSI report and the indicated A-CSI-RS resource set is less than the UE threshold (e.g., the UE 1302 reported threshold beamSwitchTiming) then the UE 1302 may apply the QCL assumption based on a default QCL assumption or based on the QCL of another downlink signal.

According to certain aspects, the UE may determine to use a default QCL assumption when there are no other downlink signals in the same symbol(s) as the triggered A-CSI-RS. As shown in FIG. 13, if the UE 1302 determines, at 1312b, that the time offset is less than the threshold (e.g., beamSwitchTiming), then the UE 1302 applies a default QCL assumption for the A-CSI-RS at 1314b. For example, the UE 1302 can determine the receive beam for receiving the A-CSI-RS based on the default QCL at 1316. The default QCL assumption may be the QCL assumption of the lowest CORESET-ID from among the CORESETS associated with the same index value as the DCI, in the latest slot in which the CORESETs are monitored within an active bandwidth (BWP) of the serving cell.

According to certain aspects, the UE 1302 may determine to use a QCL assumption of another downlink signals in the same symbol(s) as the triggered A-CSI-RS. As shown in FIG. 13, if the UE 1302 determines, at 1312b, that the time offset is less than the threshold (e.g., beamSwitchTiming), then the UE 1302 applies a QCL assumption of another downlink signal for the A-CSI-RS at 1314c.

In some examples, the UE applies the QCL assumption of another downlink signal in the same symbol(s) as the triggered A-CSI-RS that has an indicated QCL assumption (and/or a TCI state). For example, the UE may determine the index value of the CORSET in which the DCI triggering the aperiodic channel state information (AP CSI) (also referred to as A-CSI) is received. If the index value of the CORESET is the same as the index value associated with the triggered A-CSI-RS, then the UE may use the QCL assumption of that downlink signal.

In some examples, the UE applies the QCL assumption of the other downlink signal with the same index value when the other downlink signal is scheduled at an offset equal to or larger than a threshold. For example, the other downlink signal may be a PDSCH (scheduled in the same symbol(s) and with the same index value as the triggered A-CSI-RS) with an offset, from the DCI scheduling the PDSCH, which is equal to or larger than a threshold (e.g., the timeDurationForQCL threshold). The other downlink signal may be another A-CSI-RS (scheduled in the same symbol(s) and with the same index value as the triggered A-CSI-RS) with an offset, from the DCI triggering the other A-CSI-RS, which is equal to or larger than a threshold (e.g., the beamSwitchTiming threshold). In some examples, the other downlink signal is a PDCCH received in a CORESET associated with the same index value and in the same symbol(s) as the A-CSI-RS.

In some examples, the UE applies the QCL assumption of another downlink signal in the same symbol(s) as the triggered A-CSI-RS that is not associated with an index value. For example, the other downlink signal may be a semi-persistent CSI-RS or a persistent CSI-RS in the same symbol(s) as the A-CSI-RS.

In some examples, if there are multiple other downlink signals in the same symbol(s) as the A-CSI-RS, the UE applies the QCL assumption of the downlink signal associated with a lowest CSI-RS resource ID.

In some examples, if there are multiple other downlink signals in the same symbol(s) as the A-CSI-RS, the UE applies the default QCL assumption. For example, the UE may apply the QCL assumption of the lowest CORESET-ID from among the CORESETs associated with the same index value as the DCI, in the latest slot in which the CORESETs are monitored within an active BWP of the serving cell.

In some examples, if there are multiple other downlink signals in the same symbol(s) as the A-CSI-RS, the UE applies the QCL assumption of the downlink signal associated with a lowest CSI-RS resource ID when the at least two different QCL assumption are used for reception of the other downlink signals.

At 1318, the UE 1302 receives the A-CSI-RS (at t2) from the TRP 1 1304 using the determined received beam.

As noted above, if a scheduling offset between a downlink control information (DCI) that triggers an AP CSI report and the indicated AP CSI-RS (aperiodic reference signal) resource set is less than the UE reported threshold (e.g., beamSwitchTiming), and if the UE is configured by a higher layer parameter physical downlink control channel configuration (e.g., PDCCH-Config) that contains two different values of CORESETPoolIndex in two different control resource sets (CORESETs) (e.g., multi-DCI), and is capable of two simultaneous beam reception and two default QCL assumptions, then the UE determines the CORESETPoolIndex value of the CORESET in which the DCI triggering the AP CSI is received. The AP CSI-RS may be associated with that CORESETPoolIndex value. Moreover, a Quasi-Co-Location (QCL) assumption for reception of the CSI-RS may be a function the CORESETPoolIndex value. If there is any other downlink (DL) signal with an indicated QCL assumption (and/or a TCI state) in the same symbols as the CSI-RS that is associated with the same CORESETPoolIndex as the associated CORESETPoolIndex value of the AP CSI-RS, the UE applies the QCL assumption of the other DL signal.

The other DL signal may be a PDSCH scheduled with an offset larger than or equal to the threshold timeDurationForQCL that is scheduled with a DCI received in a CORESET with the same value of CORESETPoolIndex. The other downlink signal may also be another AP CSI-RS with a scheduling offset larger than or equal to beamSwitchTiming that is associated with the same value of CORESETPoolIndex. The other downlink signal may also be a PDCCH configured to be received in a CORESET with the same value of CORESETPoolIndex.

If all other DL signals are not associated with a value of CORESETPoolIndex (e.g., for semi-persistent/periodic CSI-RS), there may be several options. For example, a first option may be to follow QCL assumption of one of the other DL signals (e.g., which one (if there are multiple) may be based on the lowest CSI-RS resource ID). A second option may be to follow the same rule as in the case where no other DL signal overlaps in time with the CSI-RS symbols, as described in more detail herein. If all other DL signals are received with the same QCL assumptions, a third option may be to follow the second option; otherwise (if at least two different QCL assumptions are used for reception of the all other DL signals), follow the first option.

Otherwise (if there are no other DL signals with an indicated QCL assumption (and/or a TCI state) in the same symbols as CSI-RS), the UE may apply the default QCL assumption corresponding to the same value of CORESETPoolIndex (e.g., lowest CORESET-ID among the CORESETs which are configured with the same value of CORESETPoolIndex) in the latest slot in which one or more CORESETs associated with the same value of CORESETPoolIndex within the active BWP of the serving cell are monitored by the UE.

The default AP CSI-RS beam rule discussed above only considers the same numerology triggering. In an aspect of the present disclosure, the default AP CSI-RS beam rule may be extended for multi-DCI mTRP operation in the case of different numerology triggering. Specifically, the rule may use a corresponding beam switch latency threshold for the same or different numerology triggering. That is, spatial filter reception may be determined when different numerologies are present for scheduling PDCCH and the scheduled AP CSI-RS. The PDCCH may schedule the AP CSI-RS. The PDCCH may include DCI that includes the information that schedules the AP CSI-RS. This occurs when different CORESETPoolIndexes are configured among CORESETS, in other words, during a multi DCI based mTRP operation.

More specifically, if the scheduling offset between the DCI that triggers an AP CSI report and the indicated AP CSI-RS resource set is (1) less than the UE reported beam switch latency threshold (e.g., beamSwitchTiming) for same numerology triggering or (2) the beam switch latency threshold+additional (d) PDCCH symbols for different numerology triggering, and if the UE is configured by higher layer parameter PDCCH-Config that contains two different values of CORESETPoolIndex in two different CORESETs (e.g., multi-DCI), and is capable of two simultaneous beam receptions and two default QCL assumptions, then the spatial filtering is determined in accordance with the beam rule as discussed herein. The scheduling offset is a time difference between when the DCI is received and when the scheduled AP CSI-RS occurs.

In another aspect of the present disclosure, a UE may indicate a capability to support an offset between a scheduling DCI and a scheduled AP CSI-RS to be (1) less than the beam switch latency threshold (e.g., beamSwitchTiming) for same numerology triggering or (2) the beam switch latency threshold+a number (d) of additional PDCCH symbols for different numerology triggering. In other words, the scheduled AP CSI-RS may be triggered with the same numerology as the scheduling DCI or a different numerology than the scheduling DCI. Stated another way, the scheduling DCI, which triggers the scheduled AP CSI-RS, has the same numerology as the scheduled AP CSI-RS or a different numerology than the AP CSI-RS. If the numerology is the same, the UE can support an offset less than the beam switch latency threshold. This capability implies that the UE supports the default AP CSI-RS beam rule, which includes the AP CSI-RS beam rule in case of multi-DCI-based mTRP, as described herein.

In a further aspect of the present disclosure, a base station may send a UE a flag. If the flag is set, it means that the offset between a scheduling DCI and an AP CSI-RS can be less than the beam switch latency threshold. Without the flag being set, the offset may be equal to or greater than the beam switch latency threshold. The flag may be set if the UE indicates the capability of supporting an offset less than a threshold. The flag can be carried in DCI, a MAC-CE, or a RRC message. If the flag is set, the UE applies the AP CSI-RS beam rule described herein, for the case of a multi-DCI based mTRP.

Figure 14:
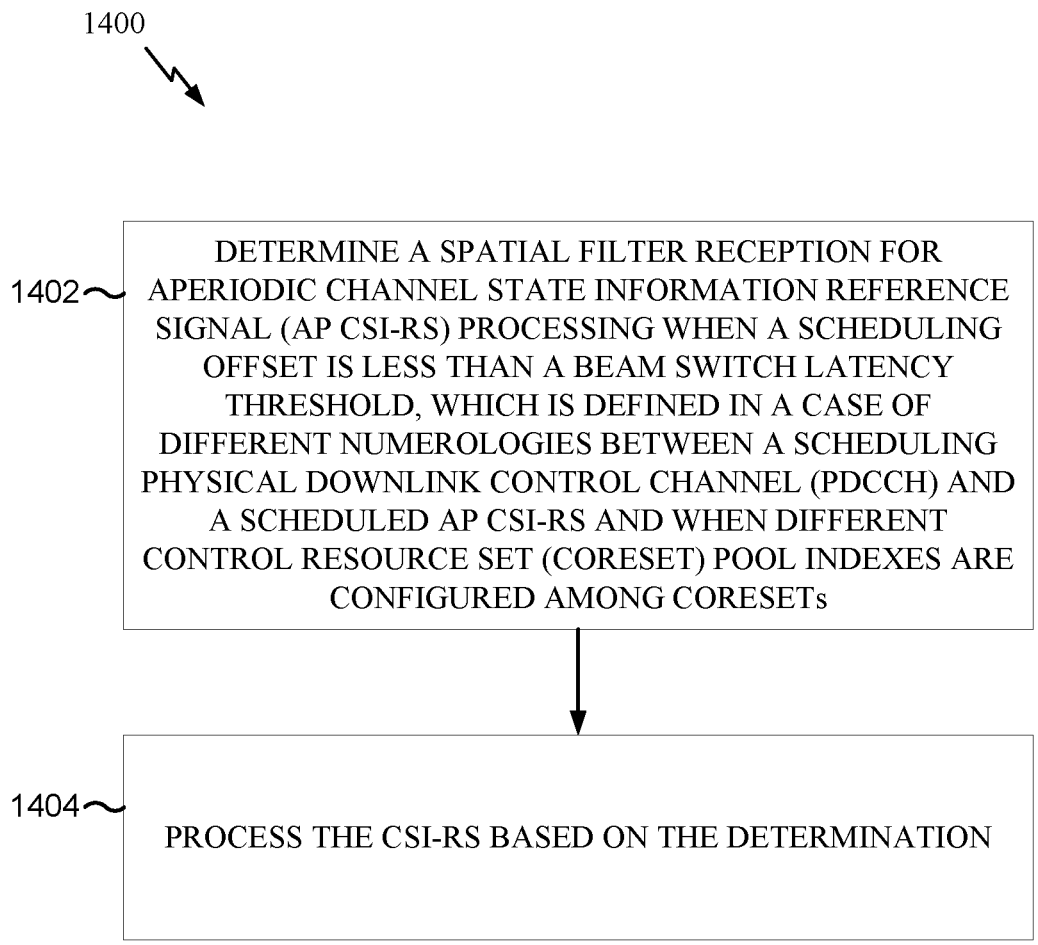
FIG. 14 is a diagram illustrating an example process for spatial filter determination by a UE, in accordance with various aspects of the present disclosure.

FIG. 14 is a diagram illustrating example operations 1400 performed, for example, by a UE, in accordance with certain aspects of the present disclosure. The example operations 1400 uses an example enhanced default AP CSI-RS beam rule for multi-DCI-based mTRP.

As shown in FIG. 14, in some aspects, the operations 1400 may include, at block 1402, the UE determining a spatial filter reception for AP CSI-RS processing when a scheduling offset is less than a beam switch latency threshold. For example, the UE (e.g., using the antenna 252, DEMOD 254, MIMO detector 256, receive processor 258, controller/processor 280, memory 282, and or the like) can determine the spatial filter reception. At block 1404, the UE may process the CSI-RS based on the determination.

Figure 15:
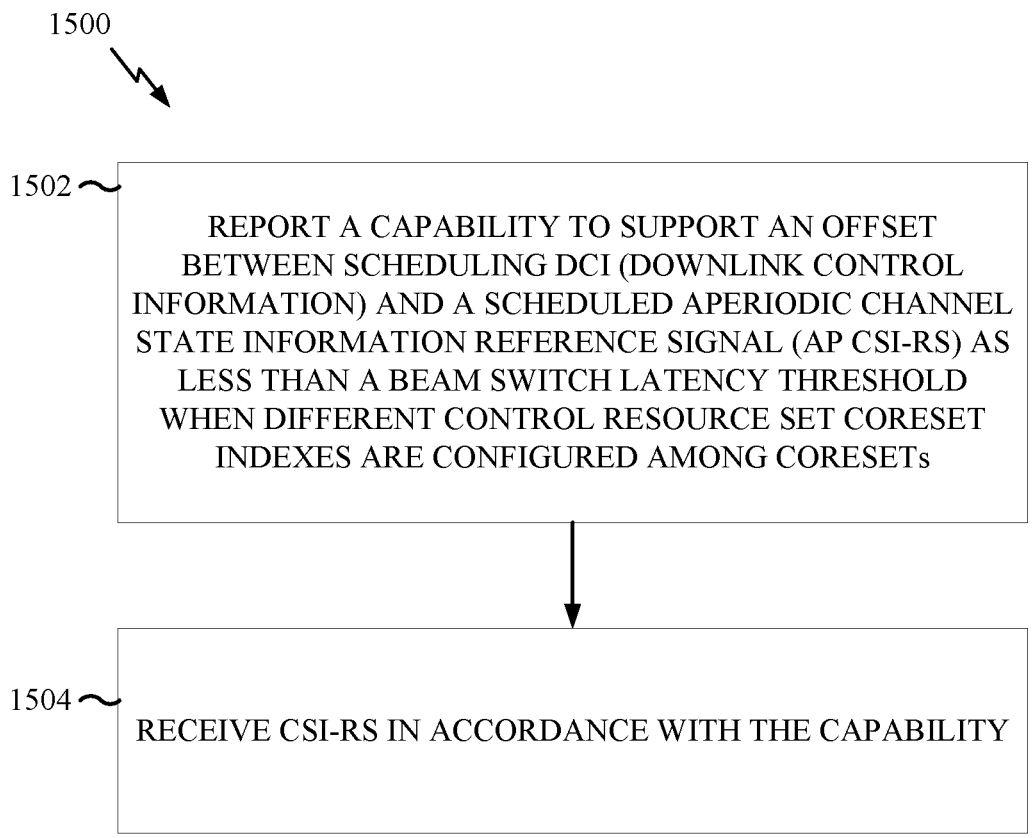
FIG. 15 is a diagram illustrating an example process for capability reporting by a UE, in accordance with various aspects of the present disclosure.

FIG. 15 is a diagram illustrating example operations 1500 performed, for example, by a UE, in accordance with certain aspects of the present disclosure. The example operations 1500 uses an example enhanced default AP CSI-RS beam rule for multi-DCI-based multiple mTRP.

As shown in FIG. 15, in some aspects, the operations 1500 may include, at block 1502, the UE reporting a capability to support an offset between scheduling DCI (downlink control information) and a scheduled AP CSI-RS as less than a beam switch latency threshold. For example, the UE (e.g., using the antenna 252, DEMOD 254, MIMO detector 256, receive processor 258, controller/processor 280, memory 282, and or the like) can report the capability. At block 1504, the UE may receive CSI-RS in accordance with the capability.

Figure 16:
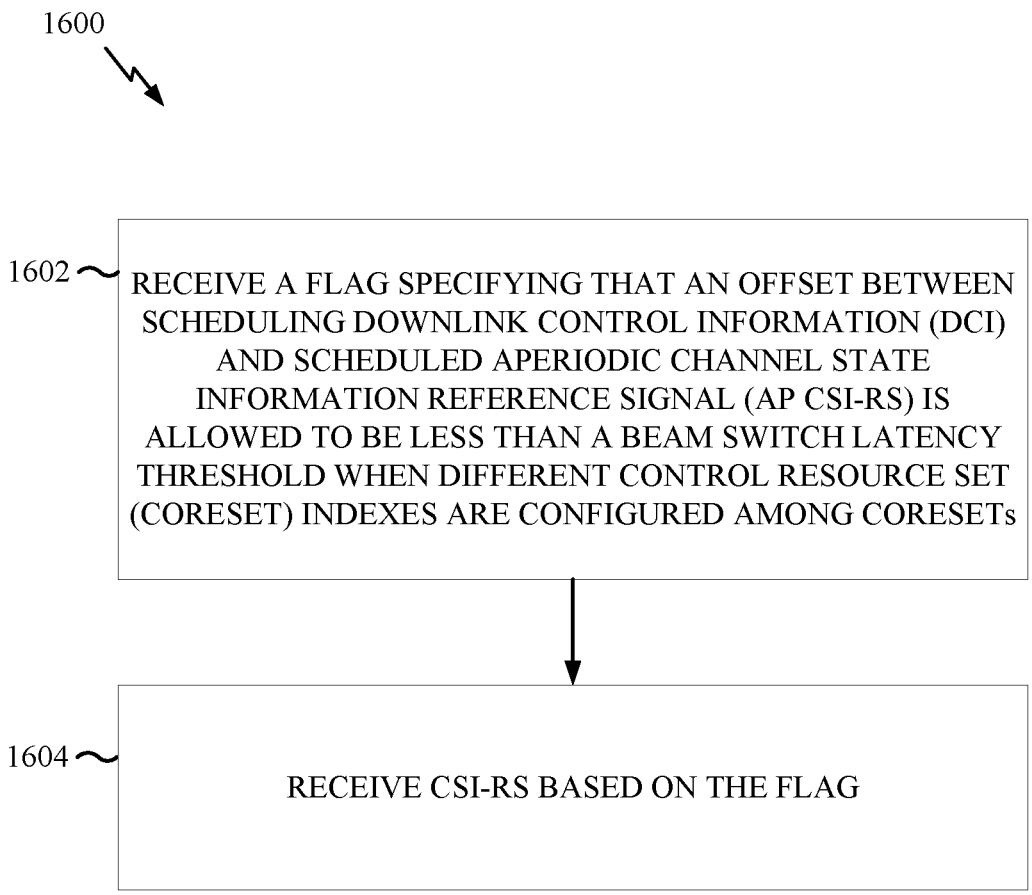
FIG. 16 is a diagram illustrating an example process for CSI processing by a UE, in accordance with various aspects of the present disclosure.

FIG. 16 is a diagram illustrating example operations 1600 performed, for example, by a UE, in accordance with certain aspects of the present disclosure. The example operations 1600 uses an example enhanced default AP CSI-RS beam rule for multi-DCI-based mTRP.

As shown in FIG. 16, in some aspects, the operations 1600 may include, at block 1602, the UE receiving a flag specifying that an offset between a scheduling DCI and scheduled AP CSI-RS is allowed to be less than a beam switch latency threshold. For example, the UE (e.g., using the antenna 252, DEMOD 254, MIMO detector 256, receive processor 258, controller/processor 280, memory 282, and or the like) can receive the flag. At block 1604, the UE may receive CSI-RS based on the flag.

Figure 17:
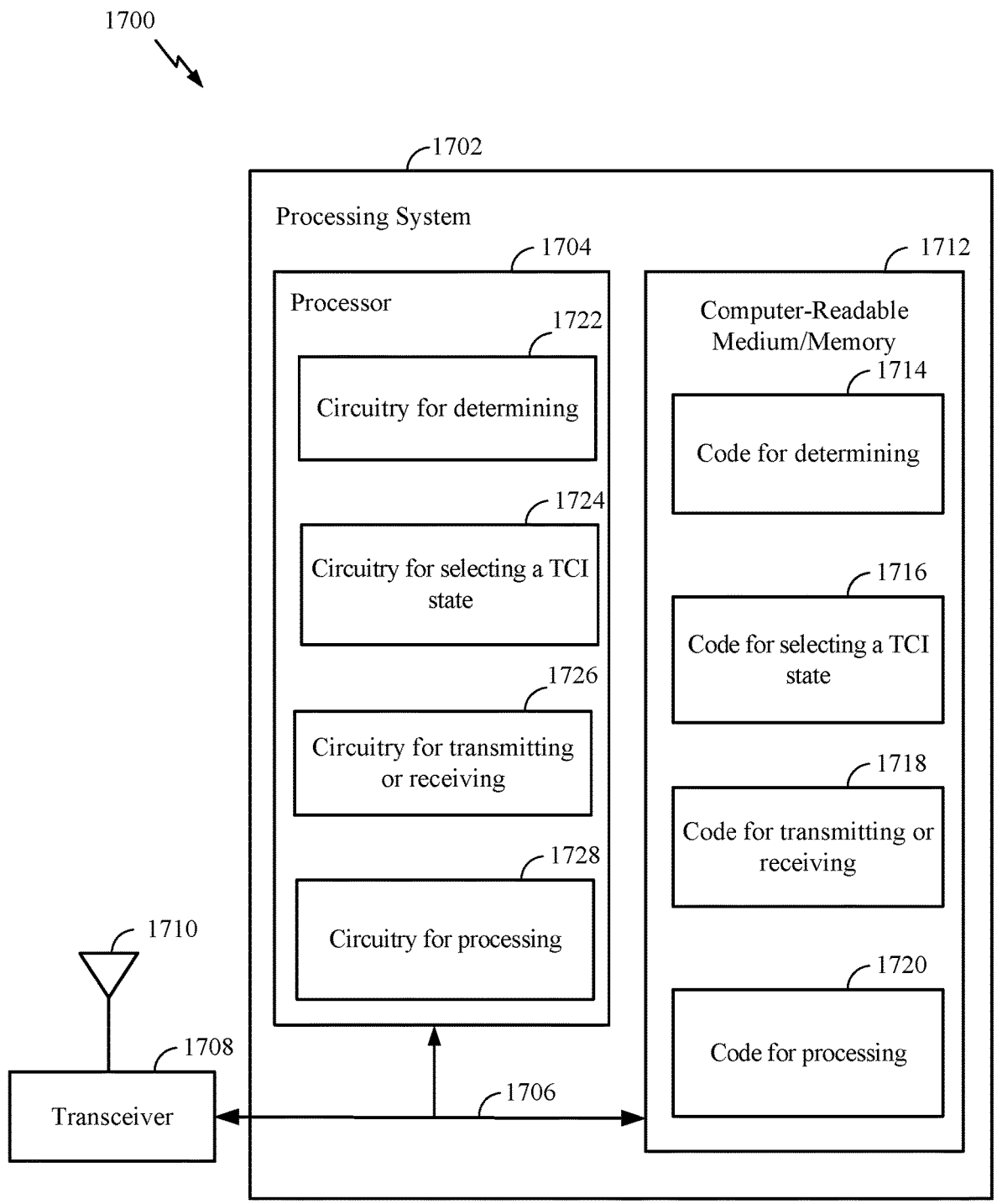
FIG. 17 illustrates a communications device that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIGS. 6 and 9. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIGS. 6 and 9, or other operations for performing the various techniques discussed herein for beam configuration selection to process CSI-RS. In certain aspects, computer-readable medium/memory 1712 stores code 1714 (e.g., an example of means for) for determining; code 1716 (e.g., an example of means for) for selecting (e.g., selecting a TCI state); code 1718 (e.g., an example of means for) for transmitting or receiving; and code 1720 for processing. In certain aspects, the processor 1704 has circuitry configured to implement the code stored in the computer-readable medium/memory 1712. The processor 1704 includes circuitry 1722 (e.g., an example of means for) for determining; circuitry 1724 (e.g., an example of means for) for selecting (e.g., selecting a TCI state); circuitry 1726 for transmitting or receiving; and circuitry 1728 (e.g., an example of means for) for processing.

Figure 18:
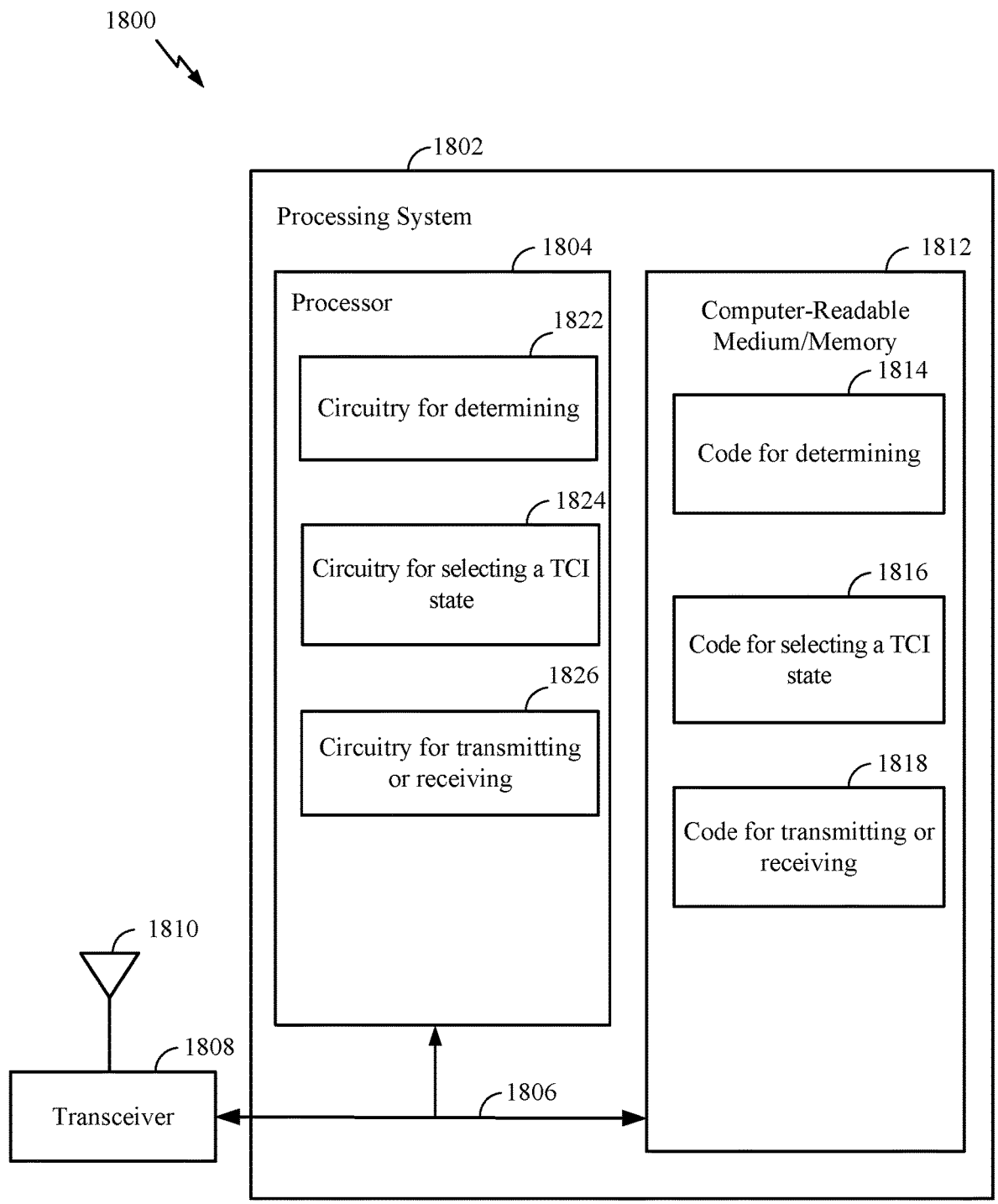
FIG. 18 illustrates a communications device that may include various components configured to perform operations for the techniques disclosed herein in accordance with aspects of the present disclosure.

FIG. 18 illustrates a communications device 1800 that may include various components (e.g., corresponding to means-plus-function components) configured to perform operations for the techniques disclosed herein, such as the operations illustrated in FIGS. 5 and 8. The communications device 1800 includes a processing system 1802 coupled to a transceiver 1808 (e.g., a transmitter and/or a receiver). The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform the operations illustrated in FIGS. 5 and 8, or other operations for performing the various techniques discussed herein for beam configuration selection to process CSI-RS. In certain aspects, computer-readable medium/memory 1812 stores code 1814 (e.g., an example of means for) for determining; code 1816 (e.g., an example of means for) for selecting (e.g., selecting a TCI state); and code 1818 (e.g., an example of means for) for transmitting or receiving. In certain aspects, the processor 1804 has circuitry configured to implement the code stored in the computer-readable medium/memory 1812. The processor 1804 includes circuitry 1822 (e.g., an example of means for) for determining; circuitry 1824 (e.g., an example of means for) for selecting (e.g., selecting a TCI state); and circuitry 1826 (e.g., an example of means for) for transmitting or receiving.

The transceiver 1708 or 1808 may provide a means for receiving or transmitting information such as packets, user data, or control information associated with various information channels (e.g., control channels, data channels, and information related to feedback, etc.). Information may be passed on to other components of the device 1700 or 1800. The transceiver 1708 or 1808 may be an example of aspects of the transceiver 254 described with reference to FIG. 2. The antenna 1710 or 1810 may correspond to a single antenna or a set of antennas. The transceiver 1708 or 1808 may provide means for transmitting signals generated by other components of the device 1700 or 1800.

The beam manager 112 or 122 may support wireless communication in accordance with examples as disclosed herein.

The beam manager 112 or 122 may be an example of means for performing various aspects described herein. The beam manager 112 or 122, or its sub-components, may be implemented in hardware (e.g., in uplink resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, the beam manager 112 or 122, or its sub-components, may be implemented in code (e.g., as configuration management software or firmware) executed by a processor, or any combination thereof. If implemented in code executed by a processor, the functions of the beam manager 112 or 122, or its sub-components may be executed by a general-purpose processor, a DSP, an ASIC, a FPGA or other programmable logic device.

In some examples, the beam manager 112 or 122 may be configured to perform various operations (e.g., receiving, determining, transmitting) using or otherwise in cooperation with the transceiver 1708, 1808.

The beam manager 112 or 122, or its sub-components, may be physically located at various positions, including being distributed such that portions of functions are implemented at different physical locations by one or more physical components. In some examples, the beam manager 112 or 122, or its sub-components, may be a separate and distinct component in accordance with various aspects of the present disclosure. In some examples, the beam manager 112 or 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

EXAMPLE ASPECTS

Aspect 1. A method for wireless communication by a user-equipment (UE), comprising: determining whether a plurality of beam configurations configured for processing one or more downlink (DL) signals are different than a first beam configuration for processing at least one CSI-RS, the one or more DL signals to be received in the same symbol as the at least one CSI-RS; selecting a second beam configuration for processing the at least one CSI-RS based on the determination; receiving the at least one CSI-RS; and processing the at least one CSI-RS based on the selected second beam configuration.

Aspect 2. The method of aspect 1, further comprising receiving multiple control resource sets (CORESETs), each indicating one of the plurality of beam configurations.

Aspect 3. The method of any one of aspects 1-2, wherein the plurality of beam configurations comprise a plurality of quasi-co location (QCL) assumptions.

Aspect 4. The method of any one of aspects 1-3, wherein, if one of the plurality of beam configurations is determined to be the same as the first beam configuration for processing the at least one CSI-RS, the one of the plurality of beam configurations is selected as the second beam configuration for processing the at least one CSI-RS.

Aspect 5. The method of any one of aspects 1-4, wherein, if the plurality of beam configurations are determined to be different than the first beam configuration for processing the at least one CSI-RS, the selection of the second beam configuration for processing the at least one CSI-RS comprises selecting, as the second beam configuration for processing the at least one CSI-RS, one of the plurality of beam configurations based on a policy.

Aspect 6. The method of aspect 5, wherein the selection of the second beam configuration based on the policy comprises selecting, as the second beam configuration for processing the at least one CSI-RS, the one of the plurality of beam configurations based on an identifier associated with the one of the plurality of beam configurations.

Aspect 7. The method of any one of aspects 5-6, further comprising receiving a medium access control (MAC)-control element (CE) having a TCI codepoint indicating the plurality of beam configurations, and wherein the selection of the second beam configuration based on the policy comprises selecting, as the second beam configuration for processing the at least one CSI-RS, the one of the plurality of the beam configurations based on a location of the one of the plurality of the beam configurations in the codepoint.

Aspect 8. The method of any one of aspects 1-7, wherein the second beam configuration for processing the at least one CSI-RS is selected based on the determination if a period between the reception of the at least one CSI-RS and reception of downlink control information (DCI) that schedules resources for the at least one CSI-RS is less than a beam switching threshold.

Aspect 9. The method of aspect 8, wherein, if the DCI and the at least one CSI-RS are associated with different numerologies, the beam switching threshold comprises a beam switching time plus a delay to account for the DCI and the at least one CSI-RS being associated with different numerologies.

Aspect 10. The method of aspect 9, wherein the delay corresponds to a duration of one or more control channel symbols.

Aspect 11. The method of any one of aspects 8-10, further comprising transmitting capability signaling indicating that the UE supports processing the at least one CSI-RS when the period between the reception of the at least one CSI-RS and the reception of the DCI is less than the beam switching threshold.

Aspect 12. The method of any one of aspects 8-11, further comprising receiving an indication of whether the period between the reception of the at least one CSI-RS and the reception of the DCI is allowed to be less than the beam switching threshold, wherein the selection of the second beam configuration for the processing the at least one CSI-RS is in response to the indication when the period is less than the beam switching threshold.

Aspect 13. The method of aspect 12, further comprising transmitting capability signaling indicating that the UE supports processing the at least one CSI-RS when the period between the reception of the at least one CSI-RS and the reception of the DCI is less than the beam switching threshold, wherein the reception of the indication of whether the period is allowed to be less than the beam switching threshold is in response to the capability signaling.

Aspect 14. The method of any one of aspects 12-13, wherein the indication is received via downlink control information (DCI), medium access control (MAC)-control element (CE), radio resource control (RRC) message, or any combination thereof.

Aspect 15. The method of aspect 1, wherein the at least one CSI-RS is received by each of the plurality of beam configurations and is stored at the UE prior to the selection of the second beam configuration for processing the at least one CSI-RS.

Aspect 16. The method of any one of aspects 1-15, wherein the at least one CSI-RS comprises an aperiodic CSI-RS.

Aspect 17. A method for wireless communication by a user-equipment (UE), comprising: receiving an indication of a plurality of beam configurations; determining whether the plurality of beam configurations are different than a first beam configuration for processing at least one CSI-RS; selecting a second beam configuration for processing the at least one CSI-RS based on the determination; receiving the at least one CSI-RS; and processing the at least one CSI-RS based on the selected second beam configuration.

Aspect 18. The method of aspect 17, wherein receiving the indication of the plurality of beam configurations comprises receiving multiple control resource sets (CORESETs), each indicating one of the plurality of beam configurations.

Aspect 19. The method of any one of aspects 17-18, wherein the indication of the plurality of beam configurations comprises a transmission configuration indicator (TCI) codepoint mapped to a plurality of TCI states.

Aspect 20. The method of aspect 19, further comprising receiving a message indicating multiple TCI codepoints, wherein the plurality of TCI states correspond to multiple TCI states of the TCI codepoint having a lowest ID among all the multiple TCI codepoints with multiple TCI states per codepoint.

Aspect 21. The method of any one of aspects 17-20, wherein the UE is unaware of any scheduled DL signal in one or more symbols with the at least one CSI-RS when the UE receives the one or more symbols.

Aspect 22. The method of any one of aspects 17-21, wherein, if one of the plurality of beam configurations is determined to be the same as the first beam configuration for processing the at least one CSI-RS, the one of the plurality of beam configurations is selected as the second beam configuration for processing the at least one CSI-RS.

Aspect 23. The method of any one of aspects 17-22, wherein, if the plurality of beam configurations are determined to be different than the first beam configuration for processing the at least one CSI-RS, the selection of the second beam configuration for processing the at least one CSI-RS comprises selecting, as the second beam configuration for processing the at least one CSI-RS, one of the plurality of beam configurations based on a policy.

Aspect 24. The method of aspect 23, wherein: receiving the indication of the plurality of beam configurations comprises receiving multiple control resource sets (CORESETs) indicating the plurality of beam configurations, respectively; and the selection of the second beam configuration based on the policy comprises selecting, as the second beam configuration for processing the at least one CSI-RS, the one of the plurality of beam configurations based on identifiers associated with the multiple CORESETs.

Aspect 25. The method of aspect 24, wherein the multiple CORESETs are in a latest slot monitored by the UE.

Aspect 26. The method of any one of aspects 24-25, wherein the multiple CORESETs are associated with a CORESET pool index, and wherein the at least one CSI-RS is associated with the same CORESET pool index.

Aspect 27. The method of any one of aspects 23-26, wherein the selection of the second beam configuration based on the policy comprises selecting, as the second beam configuration for processing the at least one CSI-RS, the one of the plurality of beam configurations based on an identifier associated with the one of the plurality of beam configurations.

Aspect 28. The method of any one of aspects 23-27, further comprising receiving a medium access control (MAC)-control element (CE) having a TCI codepoint indicating the plurality of beam configurations, and wherein the selection of the second beam configuration based on the policy comprises selecting, as the second beam configuration for processing the at least one CSI-RS, the one of the plurality of beam configurations based on a location of the one of the plurality of beam configurations in the codepoint.

Aspect 29. The method of any one of aspects 17-28, further comprising receiving a medium access control (MAC)-control element (CE) having a TCI codepoint indicating the plurality of beam configurations, the TCI codepoint being a lowest TCI codepoint of a plurality of TCI codepoints indicated by the MAC-CE.

Aspect 30. The method of any one of aspects 17-30, wherein the second beam configuration for processing the at least one CSI-RS is selected based on the determination if a period between the reception of the at least one CSI-RS and reception of downlink control information (DCI) that schedules resources for the at least one CSI-RS is less than a beam switching threshold.

Aspect 31. The method of aspect 30, wherein, if the DCI and the at least one CSI-RS are associated with different numerologies, the beam switching threshold comprises a beam switching time plus a delay to account for the DCI and the at least one CSI-RS being associated with different numerologies.

Aspect 32. The method of aspect 31, wherein the delay corresponds to a duration of one or more control channel symbols.

Aspect 33. The method of any one of aspects 17-32, wherein the at least one CSI-RS is received via each of the plurality of beam configurations and is stored at the UE prior to the selection of the second beam configuration for processing the at least one CSI-RS.

Aspect 34. The method of any one of aspects 17-33, wherein the at least one CSI-RS comprises an aperiodic CSI-RS.

Aspect 35. A method for wireless communication, comprising: determining whether a plurality of beam configurations configured for transmission of one or more downlink (DL) signals are different than a first beam configuration for transmission of at least one CSI-RS, the one or more DL signals to be transmitted in the same symbol as the at least one CSI-RS; selecting a second beam configuration for transmission of the at least one CSI-RS based on the determination; and transmitting, to a user-equipment (UE), the at least one CSI-RS based on the selected second beam configuration.

Aspect 36. The method of aspect 35, further comprising transmitting multiple control resource sets (CORESETs), each indicating one of the plurality of beam configurations.

Aspect 37. The method of any one of aspects 35-36, wherein the plurality of beam configurations comprise a plurality of quasi-co location (QCL) assumptions.

Aspect 38. The method of any one of aspects 35-37, wherein, if one of the plurality of beam configurations is determined to be the same as the first beam configuration for transmission of the at least one CSI-RS, the one of the plurality of beam configurations is selected as the second beam configuration for transmission of the at least one CSI-RS.

Aspect 39. The method of any one of aspects 35-38, wherein, if the plurality of beam configurations are determined to be different than the first beam configuration for transmission of the at least one CSI-RS, the selection of the second beam configuration for transmission of the at least one CSI-RS comprises selecting, as the second beam configuration for transmission of the at least one CSI-RS, one of the plurality of beam configurations based on a policy.

Aspect 40. The method of aspect 39, wherein the selection of the second beam configuration based on the policy comprises selecting, as the second beam configuration for transmission of the at least one CSI-RS, the one of the plurality of beam configurations based on an identifier of the one of the plurality of beam configurations.

Aspect 41. The method of any one of aspects 39-40, further comprising receiving a medium access control (MAC)-control element (CE) having a TCI codepoint indicating the plurality of beam configurations, and wherein the selection of the second beam configuration based on the policy comprises selecting, as the second beam configuration for transmission of the at least one CSI-RS, the one of the plurality of the beam configurations based on a location of the one of the plurality of the beam configurations in the codepoint.

Aspect 42. The method of any one of aspects 35-41, wherein the beam configuration for transmission of the at least one CSI-RS is selected based on the determination if a period between the transmission of the at least one CSI-RS and transmission of downlink control information (DCI) that schedules resources for the at least one CSI-RS is less than a beam switching threshold of the UE.

Aspect 43. The method of aspect 42, wherein, if the DCI and the at least one CSI-RS are associated with different numerologies, the beam switching threshold comprises a beam switching time plus a delay to account for the DCI and the at least one CSI-RS being associated with different numerologies.

Aspect 44. The method of aspect 43, wherein the delay corresponds to a duration of one or more control channel symbols.

Aspect 45. The method of any one of aspects 42-44, further comprising receiving capability signaling indicating that the UE supports processing the at least one CSI-RS when the period between reception of the at least one CSI-RS and reception of the DCI is less than the beam switching threshold.

Aspect 46. The method of any one of aspects 42-45, further comprising transmitting an indication of whether the period between the transmission of the at least one CSI-RS and the transmission of the DCI is allowed to be less than the beam switching threshold, wherein the selection of the second beam configuration for the transmission of the at least one CSI-RS is in response to the indication when the period is less than the beam switching threshold.

Aspect 47. The method of aspect 46, further comprising receiving capability signaling indicating that the UE supports processing the at least one CSI-RS when the period between reception of the at least one CSI-RS and reception of the DCI is less than the beam switching threshold, wherein the transmission of the indication of whether the period is allowed to be less than the beam switching threshold is in response to the capability signaling.

Aspect 48. The method of any one of aspects 46-47, wherein the indication is transmitted via downlink control information (DCI), medium access control (MAC)-control element (CE), radio resource control (RRC) message, or any combination thereof.

Aspect 49. The method of any one of aspects 35-48, wherein the at least one CSI-RS comprises an aperiodic CSI-RS.

Aspect 50. A method for wireless communication, comprising: determining whether a plurality of beam configurations are different than a first beam configuration for transmission of at least one CSI-RS; selecting a second beam configuration for the transmission of the at least one CSI-RS based on the determination; and transmitting, to a user-equipment (UE), the at least one CSI-RS based on the selected second beam configuration.

Aspect 51. The method of aspect 50, further comprising transmitting multiple control resource sets (CORESETs), each indicating one of the plurality of beam configurations.

Aspect 52. The method of any one of aspects 50-51, further comprising transmitting a transmission configuration indicator (TCI) codepoint mapped to the plurality of beam configurations, the plurality of beam configurations comprising a plurality of TCI states.

Aspect 53. The method of aspect 52, further comprising transmitting a message indicating multiple TCI codepoints, wherein the plurality of TCI states correspond to multiple TCI states of the TCI codepoint having a lowest ID among all the multiple TCI codepoints with multiple TCI states per codepoint.

Aspect 54. The method of any one of aspects 50-53, wherein one or more symbols having the at least one CSI-RS do not include any other DL signals.

Aspect 55. The method of any one of aspects 50-54, wherein, if one of the plurality of beam configurations is determined to be the same as the first beam configuration for transmission of the at least one CSI-RS, the one of the plurality of beam configurations is selected as the second beam configuration for transmission of the at least one CSI-RS.

Aspect 56. The method of any one of aspects 50-55, wherein, if the plurality of beam configurations are determined to be different than the first beam configuration for transmission of the at least one CSI-RS, the selection of the second beam configuration for transmission of the at least one CSI-RS comprises selecting, as the second beam configuration for transmission of the at least one CSI-RS, one of the plurality of beam configurations based on a policy.

Aspect 57. The method of aspect 56, wherein the selection of the second beam configuration based on the policy comprises selecting, as the second beam configuration for transmission of the at least one CSI-RS, the one of the plurality of beam configurations based on an identifier of the one of the plurality of beam configurations.

Aspect 58. The method of any one of aspects 56-57, further comprising transmitting a medium access control (MAC)-control element (CE) having a TCI codepoint indicating the plurality of beam configurations, and wherein the selection of the second beam configuration based on the policy comprises selecting, as the second beam configuration for transmission of the at least one CSI-RS, the one of the plurality of the beam configurations based on a location of the one of the plurality of the beam configuration in the codepoint.

Aspect 59. The method of any one of aspects 50-58, further comprising transmitting a medium access control (MAC)-control element (CE) having a TCI codepoint indicating the plurality of beam configurations, the TCI codepoint being a lowest TCI codepoint of a plurality of TCI codepoints indicated by the MAC-CE.

Aspect 60. The method of any one of aspects 50-59, wherein the second beam configuration for transmission of the at least one CSI-RS is selected based on the determination if a period between the transmission of the at least one CSI-RS and transmission of downlink control information (DCI) that schedules resources for the at least one CSI-RS is less than a beam switching threshold of the UE.

Aspect 61. The method of aspect 60, wherein, if the DCI and the at least one CSI-RS are associated with different numerologies, the beam switching threshold comprises a beam switching time plus a delay to account for the DCI and the at least one CSI-RS being associated with different numerologies.

Aspect 62. The method of aspect 61, wherein the delay corresponds to a duration of one or more control channel symbols.

Aspect 63. The method of any one of aspects 50-62, wherein the at least one CSI-RS comprises an aperiodic CSI-RS.

Aspect 64. A method of wireless communications by a user equipment (UE), comprising: determining a spatial filter reception for aperiodic channel state information reference signal (AP CSI-RS) processing when a scheduling offset is less than a beam switch latency threshold, which is defined in a case of different numerologies between a scheduling physical downlink control channel (PDCCH) and a scheduled AP CSI-RS and when different control resource set (CORESET) pool indexes are configured among CORESETs.

Aspect 65. The method of aspect 64, in which the scheduling offset is between the scheduling PDCCH and the scheduled AP-CSI-RS.

Aspect 66. The method of any one of aspects 64-65, in which the beam switch latency threshold comprises a beam switch timing plus an additional number (d) of PDCCH symbols.

Aspect 67. A method of wireless communications by a user equipment (UE), comprising: reporting a capability to support an offset between scheduling DCI (downlink control information) and a scheduled aperiodic channel state information reference signal (AP CSI-RS) as less than a beam switch latency threshold when different control resource set CORESET indexes are configured among CORESETs.

Aspect 68. The method of aspect 67, in which the scheduled AP CSI-RS can be triggered with a same numerology as the scheduling DCI or a different numerology than the scheduling DCI.

Aspect 69. A method of wireless communications by a user equipment (UE), comprising: receiving a flag specifying that an offset between scheduling downlink control information (DCI) and a scheduled aperiodic channel state information reference signal (AP CSI-RS) is allowed to be less than a beam switch latency threshold when different control resource set (CORESET) indexes are configured among CORESETs.

Aspect 70. The method of aspect 69, further comprising receiving the flag in response to reporting an ability to support the offset less than the beam switch latency threshold.

Aspect 71. The method of any one of aspects 69-70, further comprising receiving the flag via downlink control information (DCI), a media access control control element (MAC-CE) or a radio resource control (RRC) message.

Aspect 72. The method of any one of aspects 69-71, further comprising determining a spatial filter reception for aperiodic channel state information reference signal processing when a scheduling offset is less than the beam switch latency threshold, which is defined for different numerologies between the scheduling DCI and the scheduled AP CSI-RS.

Aspect 73. An apparatus comprising means for performing the method of any of aspects 1 through 63.

Aspect 74. An apparatus comprising at least one processor and a memory coupled to the at least one processor, the memory and the at least one processor being configured to perform the method of any of aspects 1 through 63.

Aspect 75. A computer readable medium storing computer executable code thereon for wireless communications that, when executed by at least one processor, cause an apparatus to perform the method of any of aspects 1 through 63.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5, 6, 8, and 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user-equipment (UE), comprising:
   determining whether a plurality of beam configurations configured for processing one or more downlink (DL) signals are different than a first beam configuration for processing at least one channel state information (CSI)-reference signal (RS), the one or more DL signals to be received in the same symbol as the at least one CSI-RS;
   selecting a second beam configuration for processing the at least one CSI-RS based on the determination;
   receiving the at least one CSI-RS; and
   processing the at least one CSI-RS based on the selected second beam configuration, wherein the second beam configuration for processing the at least one CSI-RS is selected based on the determination if a period between the reception of the at least one CSI-RS and reception of downlink control information (DCI) that schedules resources for the at least one CSI-RS is less than a beam switching threshold.

2. The method of claim 1, further comprising receiving multiple control resource sets (CORESETs), each indicating one of the plurality of beam configurations.

3. The method of claim 1, wherein the plurality of beam configurations comprise a plurality of quasi-co location (QCL) assumptions.

4. The method of claim 1, wherein, if one of the plurality of beam configurations is determined to be the same as the first beam configuration for processing the at least one CSI-RS, the one of the plurality of beam configurations is selected as the second beam configuration for processing the at least one CSI-RS.

5. The method of claim 1, wherein, if the plurality of beam configurations are determined to be different than the first beam configuration for processing the at least one CSI-RS, the selection of the second beam configuration for processing the at least one CSI-RS comprises selecting, as the second beam configuration for processing the at least one CSI-RS, one of the plurality of beam configurations based on at least one policy.

6. The method of claim 5, wherein the selection of the second beam configuration based on the at least one policy comprises selecting, as the second beam configuration for processing the at least one CSI-RS, the one of the plurality of beam configurations based on an identifier associated with the one of the plurality of beam configurations.

7. The method of claim 5, further comprising receiving a medium access control (MAC)-control element (CE) having a TCI codepoint indicating the plurality of beam configurations, and wherein the selection of the second beam configuration based on the at least one policy comprises selecting, as the second beam configuration for processing the at least one CSI-RS, the one of the plurality of beam configurations based on a location of the one of the plurality of the beam configurations in the codepoint.

8. The method of claim 1, wherein, if the DCI and the at least one CSI-RS are associated with different numerologies, the beam switching threshold comprises a beam switching time plus a delay to account for the DCI and the at least one CSI-RS being associated with different numerologies.

9. The method of claim 1, wherein the at least one CSI-RS is received by each of the plurality of beam configurations and is stored at the UE prior to the selection of the second beam configuration for processing the at least one CSI-RS.

10. A method for wireless communication by a user-equipment (UE), comprising:
    receiving an indication of a plurality of beam configurations;
    determining whether the plurality of beam configurations are different than a first beam configuration for processing at least one channel state information (CSI)-reference signal (RS);
    selecting a second beam configuration for processing the at least one CSI-RS based on the determination;
    receiving the at least one CSI-RS; and
    processing the at least one CSI-RS based on the selected second beam configuration,
    wherein the second beam configuration for processing the at least one CSI-RS is selected based on the determination if a period between the reception of the at least one CSI-RS and reception of downlink control information (DCI) that schedules resources for the at least one CSI-RS is less than a beam switching threshold.

11. The method of claim 10, wherein receiving the indication of the plurality of beam configurations comprises receiving multiple control resource sets (CORESETs), each indicating one of the plurality of beam configurations.

12. The method of claim 10, wherein, if one of the plurality of beam configurations is determined to be the same as the first beam configuration for processing the at least one CSI-RS, the one of the plurality of beam configurations is selected as the second beam configuration for processing the at least one CSI-RS.

13. The method of claim 10, wherein, if the plurality of beam configurations are determined to be different than the first beam configuration for processing the at least one CSI-RS, the selection of the second beam configuration for processing the at least one CSI-RS comprises selecting, as the second beam configuration for processing the at least one CSI-RS, one of the plurality of beam configurations based on at least one policy.

14. The method of claim 13, wherein the selection of the second beam configuration based on the at least one policy comprises selecting, as the second beam configuration for processing the at least one CSI-RS, the one of the plurality of beam configurations based on an identifier associated with the one of the plurality of beam configurations.

15. The method of claim 13, further comprising receiving a medium access control (MAC)-control element (CE) having a TCI codepoint indicating the plurality of beam configurations, and wherein the selection of the second beam configuration based on the at least one policy comprises selecting, as the second beam configuration for processing the at least one CSI-RS, the one of the plurality of beam configurations based on a location of the one of the plurality of beam configurations in the codepoint.

16. The method of claim 10, further comprising receiving a medium access control (MAC)-control element (CE) having a TCI codepoint indicating the plurality of beam configurations, the TCI codepoint being a lowest TCI codepoint of a plurality of TCI codepoints indicated by the MAC-CE.

17. The method of claim 10, wherein, if the DCI and the at least one CSI-RS are associated with different numerologies, the beam switching threshold comprises a beam switching time plus a delay to account for the DCI and the at least one CSI-RS being associated with different numerologies.

18. The method of claim 10, wherein the at least one CSI-RS is received via each of the plurality of beam configurations and is stored at the UE prior to the selection of the second beam configuration for processing the at least one CSI-RS.

19. A method for wireless communication, comprising:
determining whether a plurality of beam configurations configured for transmission of one or more downlink (DL) signals are different than a first beam configuration for transmission of at least one channel state information (CSI)-reference signal (RS), the one or more DL signals to be transmitted in the same symbol as the at least one CSI-RS;
selecting a second beam configuration for transmission of the at least one CSI-RS based on the determination; and
transmitting, to a user-equipment (UE), the at least one CSI-RS based on the selected second beam configuration, wherein the second beam configuration for transmission of the at least one CSI-RS is selected based on the determination if a period between the reception of the at least one CSI-RS and reception of downlink control information (DCI) that schedules resources for the at least one CSI-RS is less than a beam switching threshold.

20. A method for wireless communication, comprising:
determining whether a plurality of beam configurations are different than a first beam configuration for transmission of at least one channel state information (CSI)-reference signal (RS);
selecting a second beam configuration for the transmission of the at least one CSI-RS based on the determination; and
transmitting, to a user-equipment (UE), the at least one CSI-RS based on the selected second beam configuration, wherein the second beam configuration for transmission of the at least one CSI-RS is selected based on the determination if a period between the reception of the at least one CSI-RS and reception of downlink control information (DCI) that schedules resources for the at least one CSI-RS is less than a beam switching threshold.

* * * * *